United States Patent [19]

Fuse

[11] Patent Number: 5,570,464
[45] Date of Patent: Oct. 29, 1996

[54] CONTROLLER FOR A RECORDING APPARATUS

[75] Inventor: Takeshi Fuse, Ebina, Japan

[73] Assignee: Fuji Xerox Co., Ltd., Tokyo, Japan

[21] Appl. No.: 138,078

[22] Filed: Oct. 20, 1993

[30] Foreign Application Priority Data

Dec. 25, 1992 [JP] Japan .................................. 4-359513

[51] Int. Cl.$^6$ .................................................. B41J 2/07
[52] U.S. Cl. ................................................. 395/105; 358/296
[58] Field of Search .................................... 395/100, 101, 395/105, 106, 111, 115, 117, 425; 358/296

[56] References Cited

U.S. PATENT DOCUMENTS

| | | | |
|---|---|---|---|
| 4,581,710 | 4/1986 | Hasselmeier | 364/523 |
| 4,680,578 | 7/1987 | Horrig et al. | 340/731 |
| 4,790,025 | 12/1988 | Inoue et al. | 382/41 |
| 4,837,729 | 6/1989 | Funahashi | 364/900 |
| 4,873,537 | 10/1989 | Ohta | 346/108 |
| 5,047,868 | 9/1991 | Taueda et al. | 358/335 |
| 5,084,831 | 1/1992 | Moriuawa et al. | 395/116 |
| 5,121,468 | 6/1992 | Daino | 395/102 |
| 5,129,049 | 7/1992 | Cuzzo et al. | 395/113 |
| 5,138,444 | 8/1992 | Hiramatsu | 358/88 |
| 5,146,236 | 9/1992 | Hirata et al. | 346/1.1 |
| 5,191,430 | 3/1993 | Sudoh et al. | 358/296 |
| 5,195,174 | 3/1993 | Kagawa | 395/102 |
| 5,218,670 | 6/1993 | Sodek, Jr. et al. | 395/115 |
| 5,223,858 | 5/1993 | Youoi et al. | 346/134 |
| 5,307,470 | 4/1994 | Kataoua et al. | 395/425 |
| 5,311,517 | 5/1994 | Senoo | 370/95.1 |
| 5,335,316 | 8/1994 | Toyouuva | 395/115 |
| 5,373,368 | 12/1994 | Taniguro | 358/296 |

FOREIGN PATENT DOCUMENTS 4-133765  5/1992  Japan .

Primary Examiner—Mark R. Powell
Assistant Examiner—Gabriel I. Garcia
Attorney, Agent, or Firm—Oliff & Berridge

[57] ABSTRACT

A recording apparatus having a head mounted on a carriage movable relative to a recording medium. Character data, arranged in a row, is printed and recorded on the recording medium along the direction substantially orthogonal to the direction of movement of the carriage. The carriage is moved to print and record character data corresponding to one line. The recording apparatus comprises at least two storing units respectively having storage regions corresponding to one scan, an identifying device for detecting whether or not there is image data extending over a printing boundary when the image data is developed in one of the storing units, and a controller inhibiting the feeding of the recording medium when the identifying device detects the image data spreading over the printing boundary. The controller also develops a portion of the image data in the other of the storing units and printing it on the recording medium. Thus, an image, which is excellent in quality, can be obtained at a high speed without feeding the recording medium in a reverse direction and by efficiently utilizing the storing units.

23 Claims, 15 Drawing Sheets

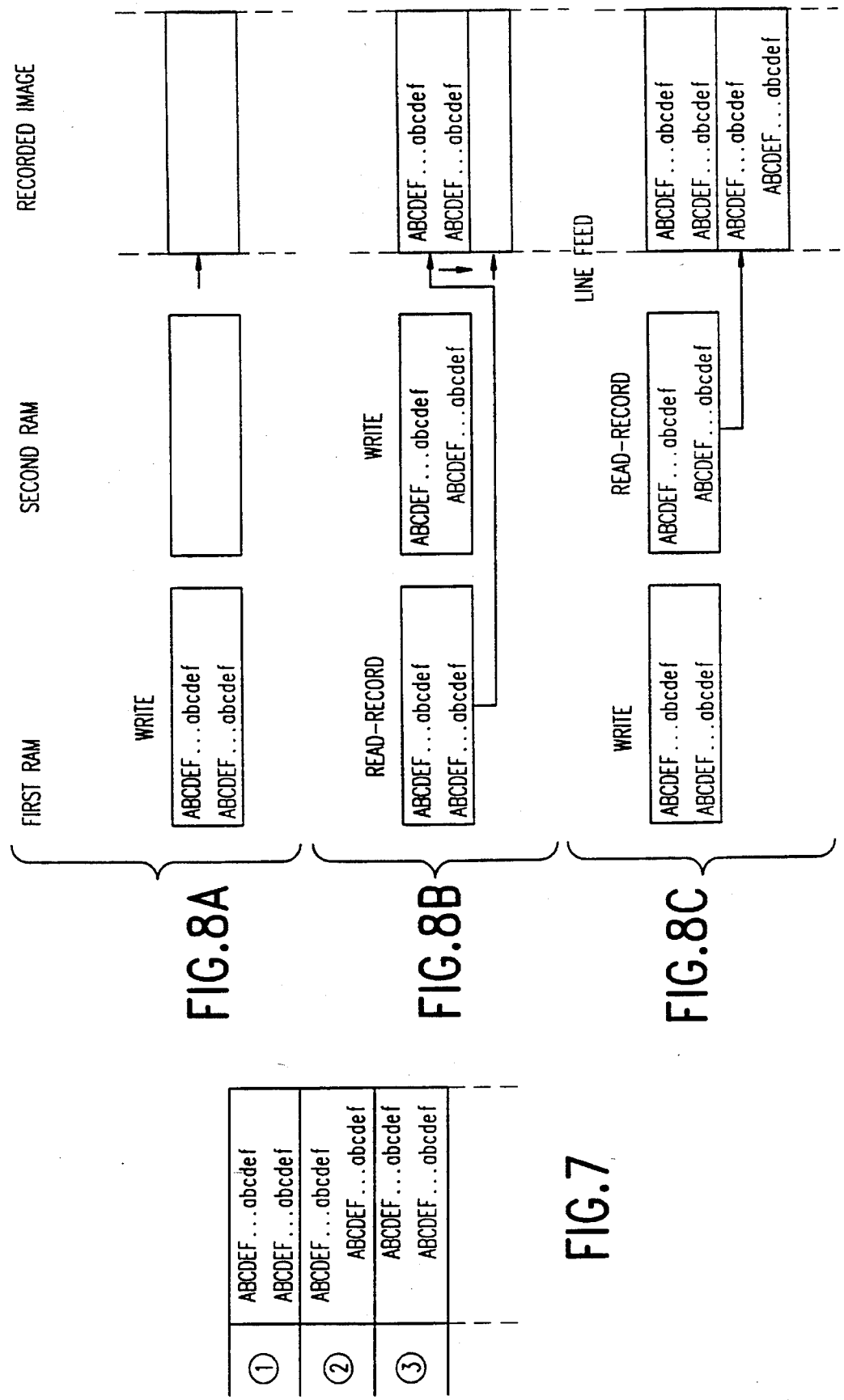

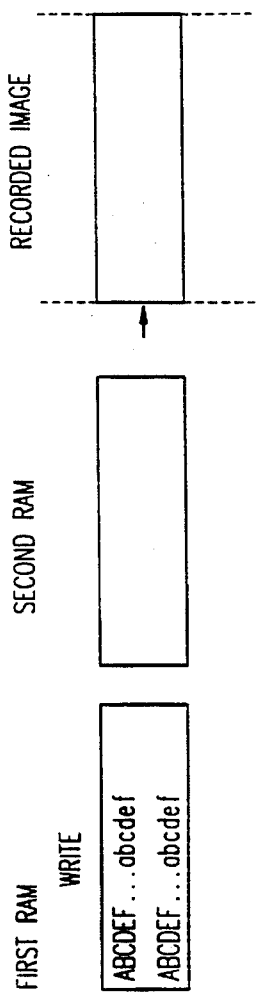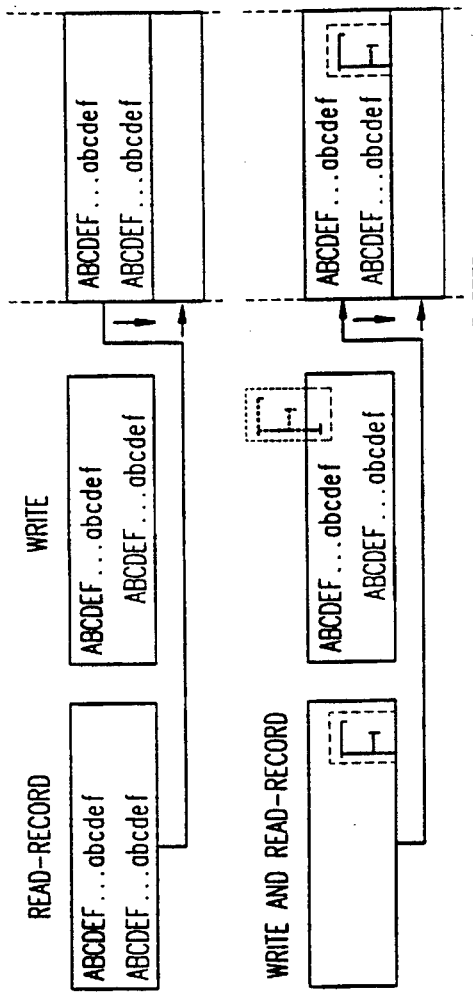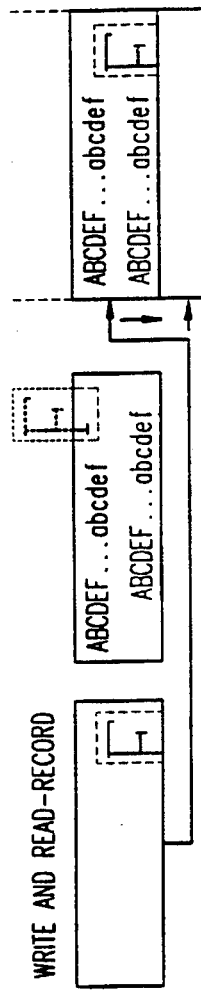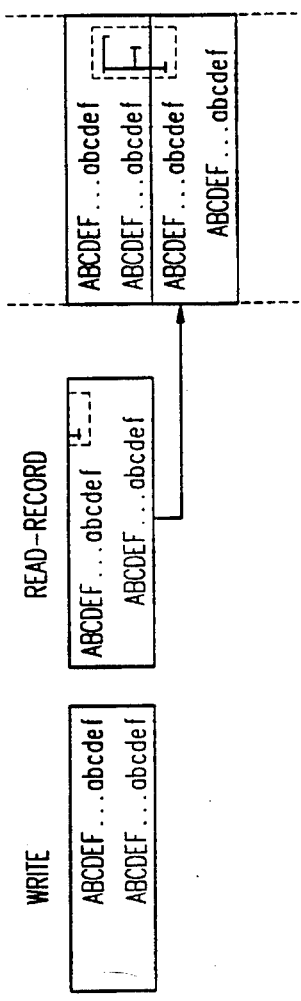
FIG.10A  FIG.10B  FIG.10C  FIG.10D
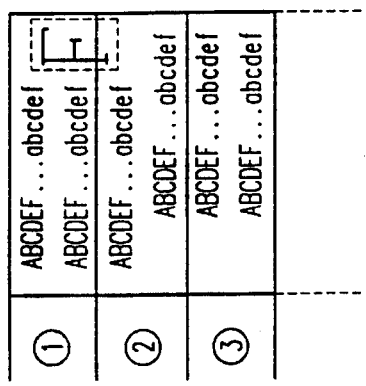
FIG.9

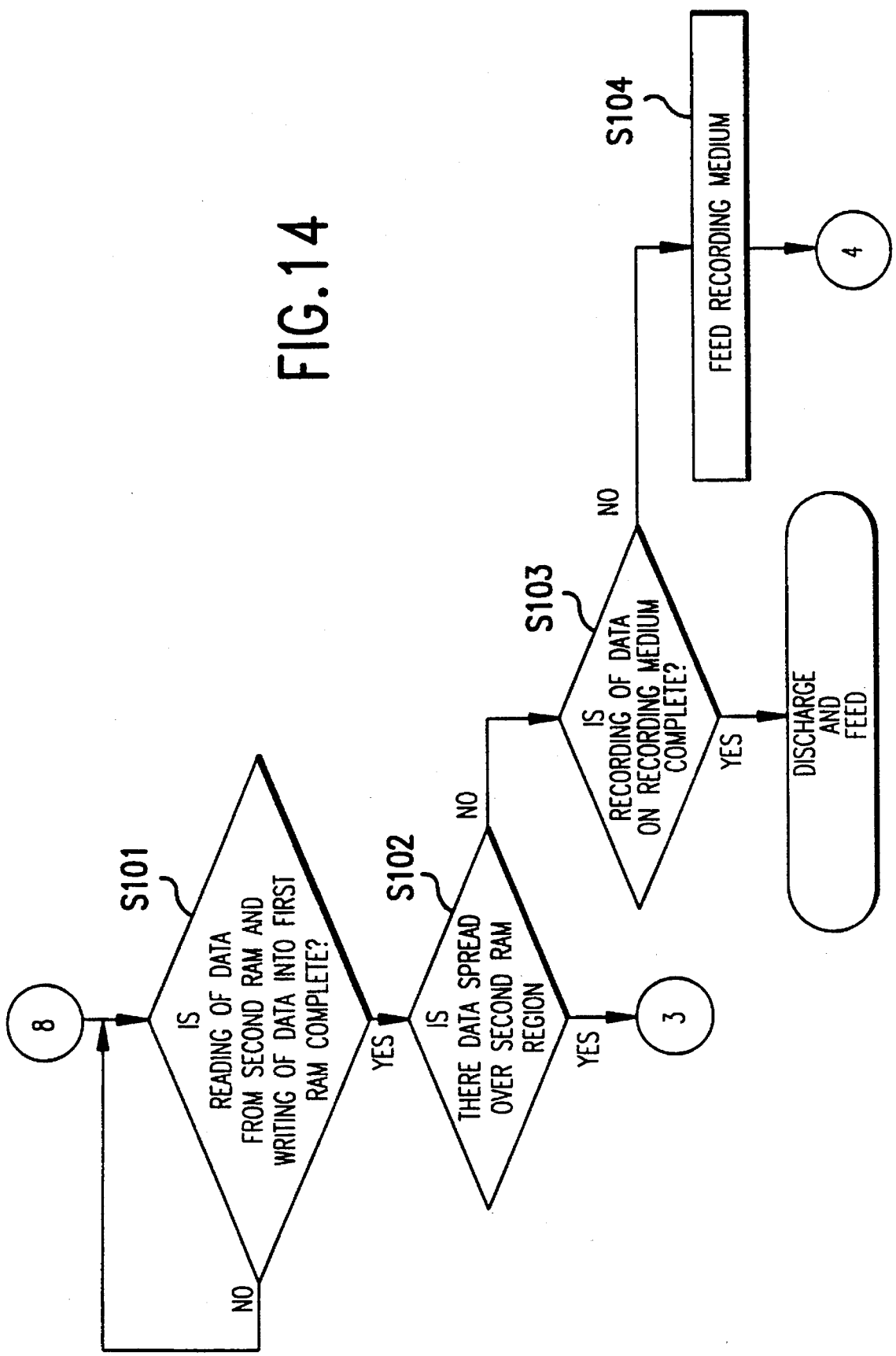

CONTROLLER FOR A RECORDING APPARATUS

BACKGROUND OF THE INVENTION

1. Field of the Invention

The present invention relates to a so-called serial type recording apparatus wherein a head is mounted on a carriage moved relative to a recording medium, character data arranged in a row is printed and recorded on the recording medium along the direction substantially orthogonal to the direction of movement of the carriage and the carriage is moved so as to print and record character data on each strip region.

2. Description of the Related Art

As the serial type recoding apparatus, there have been developed those of types such as a dot-impact type, a thermal-transfer type, an inkjet type, etc. In particular, an inkjet recording apparatus has been noted wherein heat is applied to ink by a heater to produce bubbles and the ink is discharged into a recording medium through delivery holes of a head under pressure produced by expansion of the bubbles to thereby record data on the recording medium.

There is now a demand for a recording apparatus corresponding to DTP (Desk Top Publishing) and the like. Accordingly, this type of recording apparatus has a number of functions in that, for example, kinds, sizes and recording positions of characters to be recorded can be specified accurately. When such various characters are recorded, they are developed in the form of bit map images and then recorded. The serial type recording apparatus has a problem in that since the characters are recorded for each strip region, they overflow one strip region when they are developed in the form of the bit map images. Where a large character extends over a plurality of strip regions and the positioning of its font is made at the corner of the lower part on the left side of the character, the character is often developed in a state of being spread over the previous strip region. When the character overflows one strip region and is developed in a state of being spread over the next strip region, a bit map image corresponding to only a portion developabale on a strip region used for recording of the character is stored in a bit map memory corresponding to the strip region. After completion of its recording, a bit map image in the next strip region is newly developed inclusive of a bit map image corresponding to the remaining portion. Then, the developed bit map images can be stored and recorded in the bit map memory. However, when the character is developed in a state of being spread over the previous strip region, the bit map image developed till now is erased at the time that the character extending over the previous strip region is developed. Thereafter, the portion developed in the previous strip region is developed in the bit map memory. After the recording of character data on the strip region, a recording medium is normally fed a predetermined amount. Therefore, the recording medium is conveyed in the reverse direction to record the bit map image corresponding to the portion developed in the previous strip region, thereby recording the character data on the strip region. After completion of its recording, the recording medium is fed a predetermined amount again. Further, the bit map development is made to the recording strip region to thereby record the bit map image.

In the conventional recording apparatus as described above, the bit map image is re-developed when it is desired to record the character or the like extending over the previous strip region. Thus, such re-development causes a problem that a processing time interval is made long and a recording speed is reduced in particular. The feeding of the recording medium in the reverse direction should be done and a reduction in recording speed is produced. Particularly, the inkjet recording apparatus is accompanied by a problem that droplets of ink which are not yet dried, is rubbed due to the feeding of the recording medium in the reverse direction to thereby cause a reduction in quality of an image to be recorded. Further, the accuracy of feeding of the recording medium in the reverse direction is low and an image to be recorded after completion of its feeding is positionally displaced. Thus, a further reduction in quality of the image is produced.

In order to solve such problems, there is proposed an arrangement disclosed in Japanese Patent Application Laid-Open Publication No. 4-133765 wherein recoding data are rearranged in order of recording positions and recorded in their order of rearrangement and the data which overflow a storage region, are temporarily withdrawn or kept away. According to the arrangement, the feeding of the recording medium in the reverse direction can be avoided. However, the rearrangement of the data requires much time. It is also necessary for this type of technique to provide a memory for temporarily storing or keep away the overflowed data. This memory is used only when the data is temporarily stored therein for withdrawal and hence the memory is not effectively used.

Further, there has been developed a recording apparatus wherein the capacity of a memory for temporarily storing data therein is made greater so that a storing process can be made for each page. This type of recording apparatus has drawbacks in that although a required process may not be effected on the boundary between the aforementioned recording regions, a mass-capacity type memory is required, thereby raising the cost of the recording apparatus.

In order to improve a processing speed, there is considered an application of a technique of a so-called alternate buffer which has bit map memories corresponding to a plurality of strip recording regions and alternately reads data from and writes it into the memories. According to the technique, the memories can be effectively utilized. In this type of technique, however, consideration is given only to the case where a developed bit map image falls within a strip region. Therefore, such a technique cannot cope with the case where the bit map image is developed so as to extend over the aforementioned previous strip region.

SUMMARY OF THE INVENTION

With the foregoing problems in view, it is an object of the present invention to provide a recording apparatus wherein even if a bit map image is developed so as to spread over a strip region prior to a recording strip region, an image which is excellent in quality, can be obtained at a high speed without feeding a recording medium in the reverse direction and by making good use of a memory.

According to one aspect of the present invention, for achieving the above object, there is provided a recording apparatus of a type wherein a head is mounted on a carriage moved relative to a recording medium, character data arranged in a row is printed and recorded on the recording medium along the direction substantially orthogonal to the direction of movement of the carriage and the carriage is moved to print and record character data corresponding to one line, comprising at least two storing means respectively having storage regions corresponding to one scan, identifying means for identifying whether or not there is image data extending over a printing boundary when the image data is developed in one of the storing means, and controlling means for inhibiting the feeding of the recording medium when the identifying means detects that the image data spreads over the printing boundary, developing a portion of the image data in the other of the storing means and printing it on the recording mediums.

According to the present invention, there are provided at least two storing means respectively having the storage regions corresponding to the one scan. When the number of the storing means is now two, for example, printing data can be read from one of the storing means and printing data to be printed by scanning next time can be stored in the other of the storing means while a recording operation is being effected on a region corresponding to a recording width. There is also the identifying means for detecting printing data extending over strip regions subjected to the recording operation. When the image data extending over a printing boundary between the strip regions exists, the feeding of paper is inhibited by the controlling means after the printing data has been read from the one storing means while is performing the recording operation. Further, the printing data exceeding the printing boundary is written into the one storing means. Thereafter, the printing data is recorded with the second printing scan. As a result, the printing data extending over the previous strip region can also be recorded without feeding the recording medium in the reverse direction. At this time, a bit map image in the corresponding strip region is also stored in the other storing means. Further, a waste of processing time required to effect bit map development can be saved and the plurality of storing means can be effectively used.

According to the present invention, as is apparent from the above description, there are provided the plurality of storing means and they are switched over to effect writing and reading processes. Therefore, the recording operation can be carried out at a high speed. Further, when there is data extending over the strip region prior to the strip region while being in writing operation at present, e.g., even when a font having a size larger than the width of the strip region is recorded, it can be recorded without a reverse line-feeding operation. As a result, an advantageous effect can be brought about in that an image whose quality is high can be obtained at a high speed.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 7 is a view for explaining one example of a print made by normal recording;

FIGS. 8(A)–8(C) are views for explaining the contents in the image RAM at the time of the normal recording;

FIG. 9 is a view for describing one example of a print of an image extending over two strip regions;

FIGS. 10(A)–10(D) are views for describing the contents of the image RAM at the time of recording of images each extending over two strip regions and the images recorded in the image RAM; and FIGS. 11 through 16 are respectively flowcharts for describing the operations of the memory controller shown in FIG. 3.

DETAILED DESCRIPTION OF THE PREFERRED EMBODIMENTS

Figure 1:
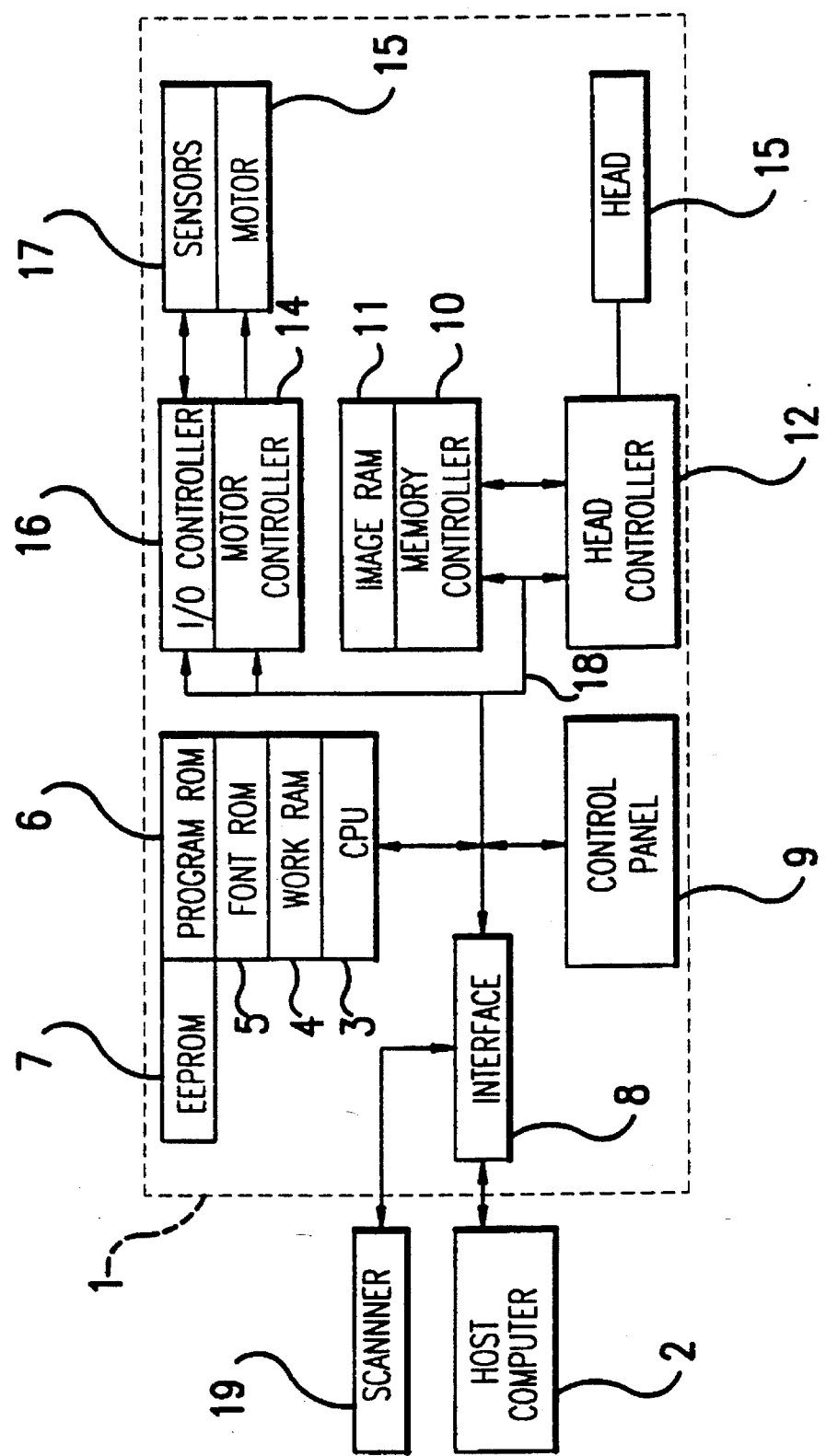
FIG. 1 is a view showing the structure of a system illustrative of one embodiment of a recording apparatus according to the present invention.

FIG. 1 is a view showing the structure of a system illustrative of one embodiment of a recording apparatus according to the present invention. An inkjet recording apparatus will be described below as one example of a serial type recording apparatus in the present embodiment. There are shown in the same drawing, an inkjet recording apparatus 1, a host computer 2, a CPU 3, a work RAM 4, a font ROM 5, a program ROM 6, an EEPROM 7, an interface 8, a control panel 9, a memory controller 10, an image RAM 11, a head controller 12, a recording head 13, a motor controller 14, a motor 15, an I/O controller 16, sensors 17, a common bus 18, and a scanner 19.

The inkjet recording apparatus 1 is electrically connected to the host computer 2 and the scanner 19. The transfer or transmission and reception of data is performed between them. The CPU 3 is electrically connected to the work RAM 4, the font ROM 5, the program ROM 6 and the EEPROM 7. Further, the CPU 3 is operated in accordance with programs stored in the program ROM 6 while being referred to set values stored in the EEPROM 7, such as correction data for making the quality of an image higher, etc. Moreover, the CPU 3 is also electrically connected to the common bus 18 and controls the respective components in the inkjet recording apparatus 1 via the common bus 18. The work RAM 4 is used as a working storage region of the CPU 3 and used to store various information or the like in the system therein. The font ROM 5 stores data about image formats descriptive of the layout of characters to be printed. The program ROM 6 stores the programs for giving operational instructions to the CPU 3. The EEPROM 7 is a nonvolatile memory and stores various set values such as the correction data for making the quality of the image higher, operating modes used for the system, etc. because the contents are held therein even if a power source is turned off. These data are often set by using the control panel 9.

The interface 8 is electrically connected to the common bus 18, the host computer 2 and the scanner 19. The interface 8 transmits data to either host computer 2 or the scanner 19 and receives the same therefrom. The control panel 9 is electrically connected to the common bus 18. Further, the control panel 9 receives various inputs from a user and displays various states and messages to be notified to the user thereon.

The memory controller 10 is electrically connected to the image RAM 11, the common bus 18 and the head controller 12 and controls the image RAM 11. The image RAM 11 stores data to be recorded in an image format.

The head controller 12 is electrically connected to the recoding head 13, the common bus 18 and the memory controller 10. Further, the head controller 12 controls the timing for delivering ink from each of nozzles of the recording head 13 and the like. The recording head 13 comprises a plurality of heads respectively having N nozzles. The recording head may be one or may comprise four recoding heads for black B, cyan C, magenta M and yellow Y in the case of color printing, for example.

The motor controller 14 is electrically connected to the motor 15 and the common bus 18 and controls the motor 15. The motor 15 moves or displaces a carriage with the recording head 13 placed thereon relative to a recording medium such as recording paper. The I/O controller 16 is electrically connected to the sensors 17 and the common bus 18. Further, the I/O controller 16 controls the sensors 17 and takes in data sensed by the sensors 17. As the sensors 17, there are known those such as a paper-end sensor, a paper-width sensor, an ink-amount sensor, etc.

The common bus 18 provides the electrical connections between the CPU 3, the interface 8, the control panel 9, the memory controller 10, the head controller 12, the motor controller 14 and the I/O controller 16. Further, the common bus 18 provides the transfer of various data and control signals therebetween.

The aforementioned structure is functionally divided into the respective components. However, the image RAM 11 and the work RAM 4 may be modified as the same RAM.

The operation of the system shown in FIG. 1 will now be described. The CPU 3 is activated in accordance with the programs stored in the program ROM 6 while being referred to the set values and the like stored in the EEPROM 7. Upon activation of the CPU 3, the work RAM 4 is used as needed. The set values and the like stored in the EEPROM 7 are set by using the control panel 9. Further, the CPU 3 brings information from the sensors 17 via the I/O controller 16 and checks whether or not the information can be recorded. Moreover, the CPU 3 instructs the motor controller 14 to effect processes such as the displacement of the carriage, the feeding of the recording paper, etc., thereby effecting processes such as the alignment of data with its corresponding recording position, etc.

When data to be recorded such as image data, text data, etc. are fed from the host computer 2 or the scanner 19, the interface 8 receives such information therein and transfers it to either the CPU 3 or the memory controller 10. When, for example, the text data is sent from the host computer 2, the CPU 3 supplies image data corresponding to character codes to the memory controller 10 using the font ROM 5 in accordance with a printing format. The memory controller 10 causes the image RAM 11 to store the image data sent via the common bus 18 therein. At this time, the memory controller 10 controls a characteristic of the sent image data, i.e., either a raster direction or a vector direction and controls a direction to be written into the image RAM 11 according to the direction of rotation of an image, etc., thereby performing format conversion.

When the image data to be printed is stored, the temperature of the head 13 is detected by each of temperature sensors respectively incorporated in a printer body 1 and the head 13. Then, the CPU 3 decides the width of a head drive pulse and a drive operating mode on the basis of the detected temperature. Particularly when the temperature of the head 13 is low and the head 13 is left unused as it is for a long period of time immediately before printing, a bad influence is exerted upon ink delivery characteristics. Therefore, the CPU 3 increases the temperature of the head 13 up to the optimum temperature range in which the ink delivery characteristics are relatively stable and performs an auxiliary driving operation while carrying out control for recovery of cloggings. Next, the CPU 3 requires the motor controller 14 to move the carriage so that it performs scanning. An encoder for generating printing timing is attached to the carriage with the recording head 13 mounted thereon and inputs printing timing corresponding to the scanning speed of the carriage to the CPU 3 and the head controller 12. The CPU 3 decides a printing start position in response to the printing timing and supplies a gate signal indicative of printing permission to the head controller 12. In response to the gate signal and a printing timing signal, the head controller 12 requires the memory controller 10 to read printing data. Further, the head controller 12 sends the read printing data to the recording head 13 and outputs a head driving signal to the recording head 13. When the operation referred to above has been performed in succession and the printing corresponding to one scan is completed, an interrupt is caused by the memory controller 10 and input to the CPU 3 as an interrupt signal. In response to the interrupt signal, the CPU 3 requires the motor controller 14 to convey a recording medium by a print recording width and to cause the carriage to re-scan. Thus, the printing corresponding to one scan is effected a plurality of times until a print recording operation in recording-medium conveying direction is completed. In the present embodiment, a head's temperature and an environmental temperature are detected before the one-scan printing is started and the width of the head drive pulse and the drive operating mode are decided as often as they are detected.

When the printing operation effected on one recording medium is completed in this way, the CPU 3 requires the motor controller 14 to discharge the recording medium, move the carriage to the position of provision of a cap mechanism for preventing ink from drying and covering a nozzle section and effect a cap operation. Thereafter, the CPU 3 is waiting until the next printing operation.

The printing operation effected on the one recording medium is completed in accordance with a series of operations.

Figure 2:
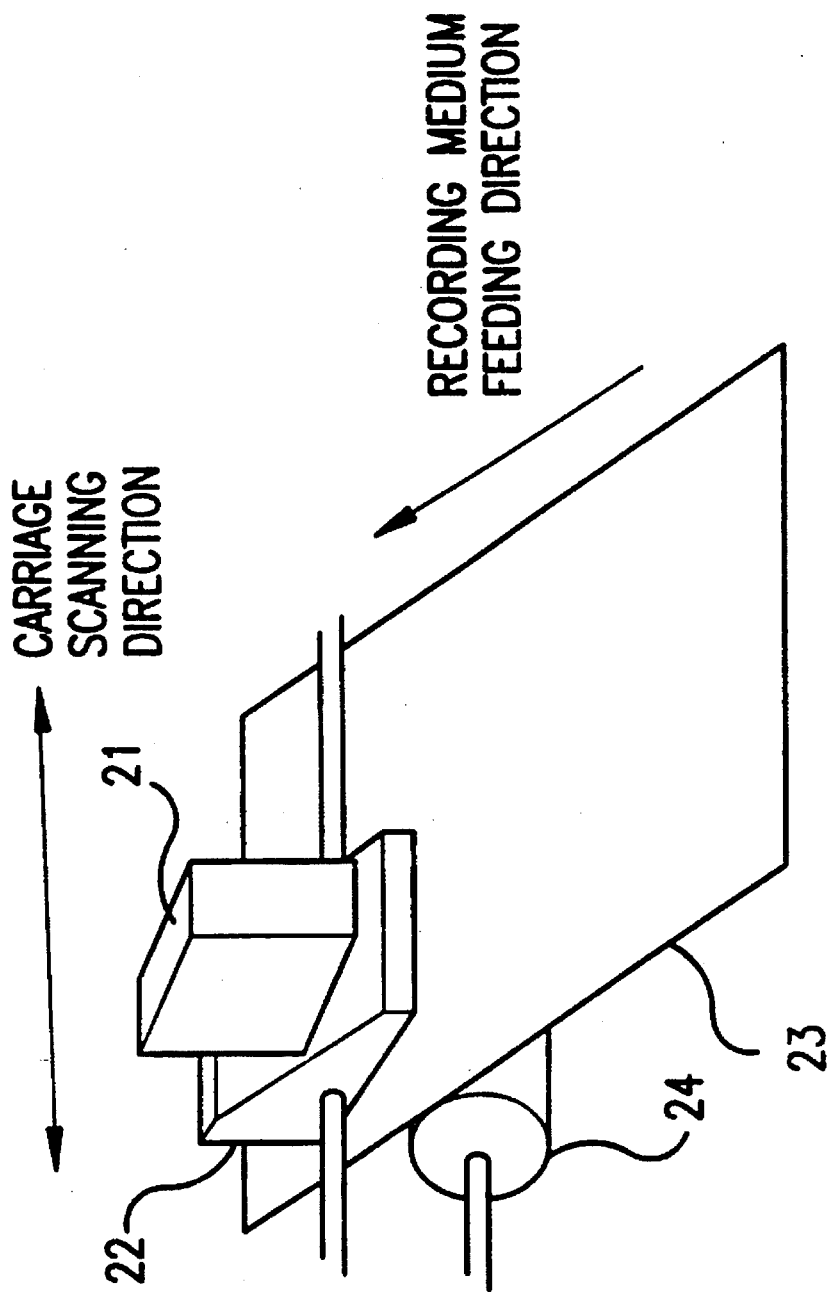
FIG. 2 is a view schematically illustrating the structure of devices about a carriage employed in the embodiment shown in FIG. 1.

FIG. 2 is a view schematically illustrating the structure of devices about a carriage employed in the embodiment of the recording apparatus according to the present invention. In the drawing, reference numeral 21 indicates a recording head unit and reference numerals 22, 23, 24 and 25 respectively indicate a carriage, a recording medium, a transport roller and a maintenance station. The carriage 22 has one or a plurality of recording head units 21 mounted thereon. Each recording head unit 21 has a plurality of nozzles. Ink is spurted or discharged from the nozzles while the carriage 22 is caused to scan from side to side, thereby performing a printing process. When one scan is made by the carriage 22, the transport roller 24 feeds the recording medium 23 by a predetermined amount in the recording-medium conveying direction. The printing to be effected on one recording paper is completed by repeating such an operation. When the printing is not performed, the carriage 22 is moved to its home position and placed in a waiting state. When the recording apparatus is of an inkjet type, the maintenance station 25 is provided at the home position to effect processes such as the prevention of the nozzles from drying, an increase in temperature of the head at the commencement of data recording, a clogging removal, etc.

In the present embodiment, the displacement of the recording medium in the upward and downward directions corresponds to that of the recording medium from side to side. However, the carriage 22 may be displaced. The displacement of the recording medium may be made by a printing width taken upon one printing or a predetermined line-feeding width. Alternatively, blank parts of the recording medium, which are subjected to scanning, may be collectively fed. Further, when, for example, the recoding medium is fed and the recoding medium is positioned upon recording data thereon in accordance with a predetermined format, the recording medium may be fed in accordance with instructions issued from the CPU 3 or the displacement of the recording medium may also be changed in accordance with instructions given from the host computer 2.

Figure 3:
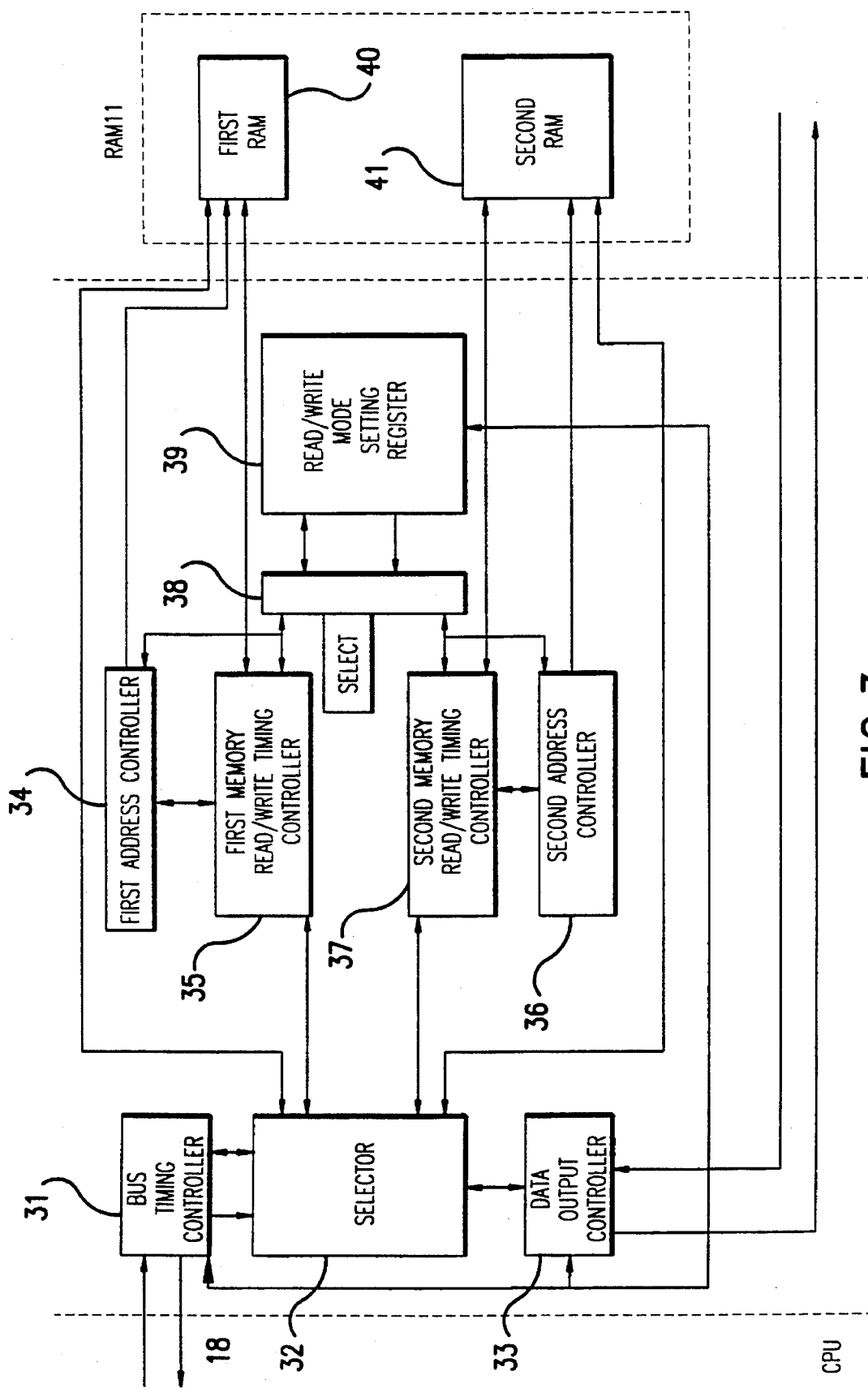
FIG. 3 is a block diagram showing one example of a memory controller employed in the embodiment shown in FIG. 1.
Figure 4:
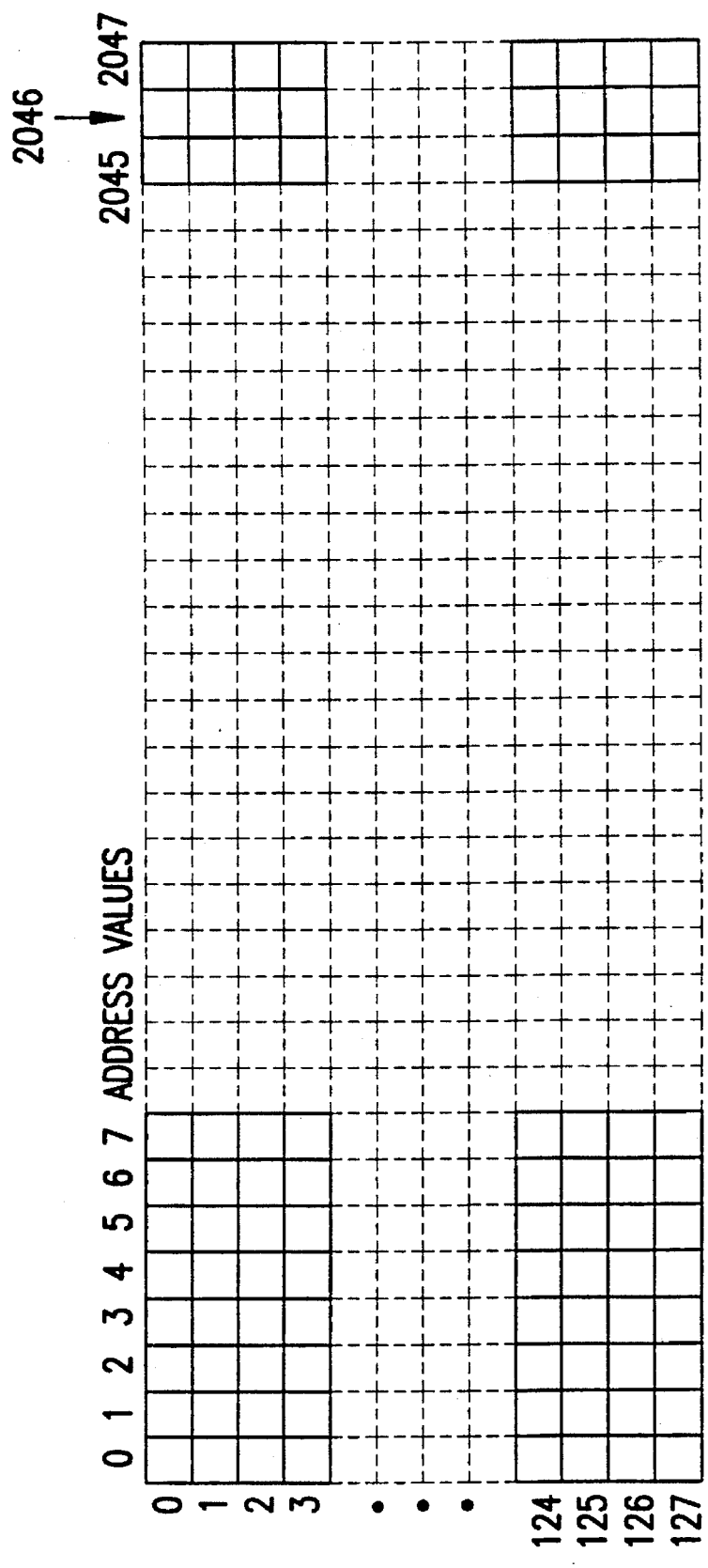
FIG. 4 is a view for explaining an image RAM.

FIG. 3 is a block diagram showing one example of a memory controller employed in the embodiment of the recording apparatus according to the present invention. In the same drawing, the same elements of structure as those shown in FIG. 1 are identified by like reference numerals and their description will therefore be omitted. There are shown in FIG. 3, a bus timing controller 31, a selector 32, a data output controller 33, a first address controller 34, a first memory read/write timing controller 35, a second address controller 36, a second memory read/write timing controller 37, a selector 38, a read/write mode setting register 39, a first RAM 40 and a second RAM 41. FIG. 4 is a view for describing the image RAM.

The image RAM 11 comprises the first and second RAMs 40 and 41. As shown in FIG. 4, each of the first and second RAMs 40 and 41 is constructed in such a manner that the length of data is of one bit and 2048 storage elements and 128 storage elements are respectively two-dimensionally arranged in row and column directions. Now, the number of the storage elements in the column direction corresponds to the number of dots corresponding to one column which can be printed by the head, whereas the number of the storage elements in the row direction corresponds to the number of dots recorded according to the scanning of the carriage. Each of the respective RAMs can be made up of a DRAM. Alternatively, other storage elements such as an SRAM, etc. may be used as the RAMs. The first RAM 40 receives an address from the first address controller 34 and accepts various control signals from the first memory read/write timing controller 35. Further, the first RAM 40 writes one bit data output from the bus timing controller 31 therein and sends the read one bit data to the data output controller 33. Similarly, the second RAM 41 receives an address from the second address controller 36 and accepts various control signals from the second memory read/write timing controller 37. Further, the second RAM 41 writes the one bit data output from the bus timing controller 31 therein and transfers the read one bit data to the data output controller 33.

The bus timing controller 31 is electrically connected to the CPU 3 via the common bus 18 such as a data bus, a control bus or the like or to other external hardware sequencer via the interface 8. The bus timing controller 31 corresponds to an interface section capable of linking the common bus with other hardware and has a parallel/serial converting function for converting image data sent as parallel data into image data represented in the form of one bit. Further, the bus timing controller 31 receives a control signal sent from the CPU 3, timing signals transmitted from the first and second memory read/write timing controllers 35 and 37 and mode information set to the read/write mode setting register 39. Moreover, the bus timing controller 31 requires either one of the first and second memory read/write timing controllers 35 and 37 to generate a data write signal. Thereafter, the bus timing controller 31 transfers write data to the image RAM 11 in synchronism with the data write signal sent from either one of the first and second memory read/write timing controllers 35 and 37.

In accordance with an image data request issued from the head controller 12, the data output controller 33 outputs printing data in synchronism with a read clock sent from the head controller 12. That is, the data output controller 33 performs control for interface necessary to effect communication with the head controller 12. Further, the data output controller 33 receives the timing signals sent from the first and second memory read/write timing controllers 35 and 37 and the mode information set to the read/write mode setting register 39 therein in a manner similar to the bus timing controller 31. Moreover, the data output controller 33 requires either one of the first and second memory read/write timing controllers 35 and 37 to generate a data read signal. Then, the data output controller 33 temporarily stores, in an internal register, data read from the image RAM 11 in synchronism with the generated data read signal. The data stored in the internal register is transferred and outputted to a data outputting register in synchronism with the image data request issued from the head controller 12 and the read clock generated from the head controller 12. During the printing, the two registers are operated simultaneously.

The selector 32 selects one of the RAMs subjected to the data writing control of the bus timing controller 31 and the data reading control of the data output controller 33. That is, when the data is written into the first RAM 40 and the data is read from the second RAM 41, the selector 32 connects the bus timing controller 31 and the first memory read/write timing controller 35 to one another and also connects the data output controller 33 and the second memory read/write timing controller 37 to one another. When, on the other hand, the data is read from the first RAM 40 and the data is written into the second RAM 41, the selector 32 connects the bus timing controller 31 and the second memory read/write timing controller 37 to each other and also connects the data output controller 33 and the first memory read/write timing controller 35 to each other.

The first and second memory read/write timing controllers 35 and 37 respectively produce control signals necessary to write the data to and read it from the image RAM 11. The first and second memory read/write timing controllers 35 and 37 respectively receive a writing request issued from the bus timing controller 31, a reading request issued from the data output controller 33 and mode information sent from the read/write mode setting register 39. Further, each of the memory read/write timing controllers 35 and 37 sends a control signal such as a write signal or a read signal to the image RAM 11 upon completion of a refresh cycle while observing the refresh cycle. Moreover, when an interrupt is triggered by a built-in refresh timer at regular time intervals, each of the memory read/write timing controllers 35 and 37 internally produces a refresh control signal and outputs it to the image RAM 11. The first and second memory read/write timing controllers 35 and 37 are electrically connected to the first and second address controllers 34 and 36 respectively. Further, they send the timing signals to their corresponding first and second address controllers 34 and 36. Either one of the first and second memory read/write timing controllers 35 and 37 sends timing signals for writing and reading of data to either the bus timing controller 31 or the data output controller 33.

Each of the first and second address controllers 34 and 36 comprises a row-directional address counter, a column-directional address counter and a multiplexer and sets a specific one bit address to the image RAM 11. These address counters can count up and down respectively. The operating mode of each of the address counters is decided based on the read/write mode set to the read/write mode setting register 39. Further, the address counters start counting in response to clocks generated from the first and second memory read/write timing controllers 35 and 37. The data output from the row-directional and column-directional address counters are supplied to the image RAM 11 on a time-sharing basis by the multiplexer. The timing for outputting the data on the time-sharing basis is set in accordance with the control signal produced from each of the first and second memory read/write timing controllers 35 and 37.

The read/write mode setting register 39 stores setting data for deciding operating modes of the bus timing controller 31, the first and second memory read/write timing controllers 35 and 37, the data output controller 33, the first and second address controllers 34 and 36. The data stored in the read/write mode setting register 39 are controlled by the selector 38 so as to be supplied to the controllers which are performing either a writing process or a reading process. Further, the read/write mode setting register 39 has a comparator provided thereinside. When the set value coincides with the data output from each of the first and second address controllers 34 and 36, the read/write mode setting register 39 effects the control for outputting a flag to the bus timing controller 31. Thus, a function for partially writing data into the image RAM 11 can be realized.

The selector 38 supplies the write or read operating mode set to the read/write mode setting register 39 to the corresponding address controller and memory read/write timing controller which are respectively performing either the writing process or the reading process. Further, the selector 38 inputs address values output from the address controllers to the read/write mode setting register 39. When the first RAM 40 is activated in the write mode and the second RAM 41 is activated in the read mode, for example, the write operating mode is set to the first address controller 34 and the first memory read/write timing controller 35 and the read operating mode is set to the second address controller 36 and the second memory read/write timing controller 37.

Figure 5:
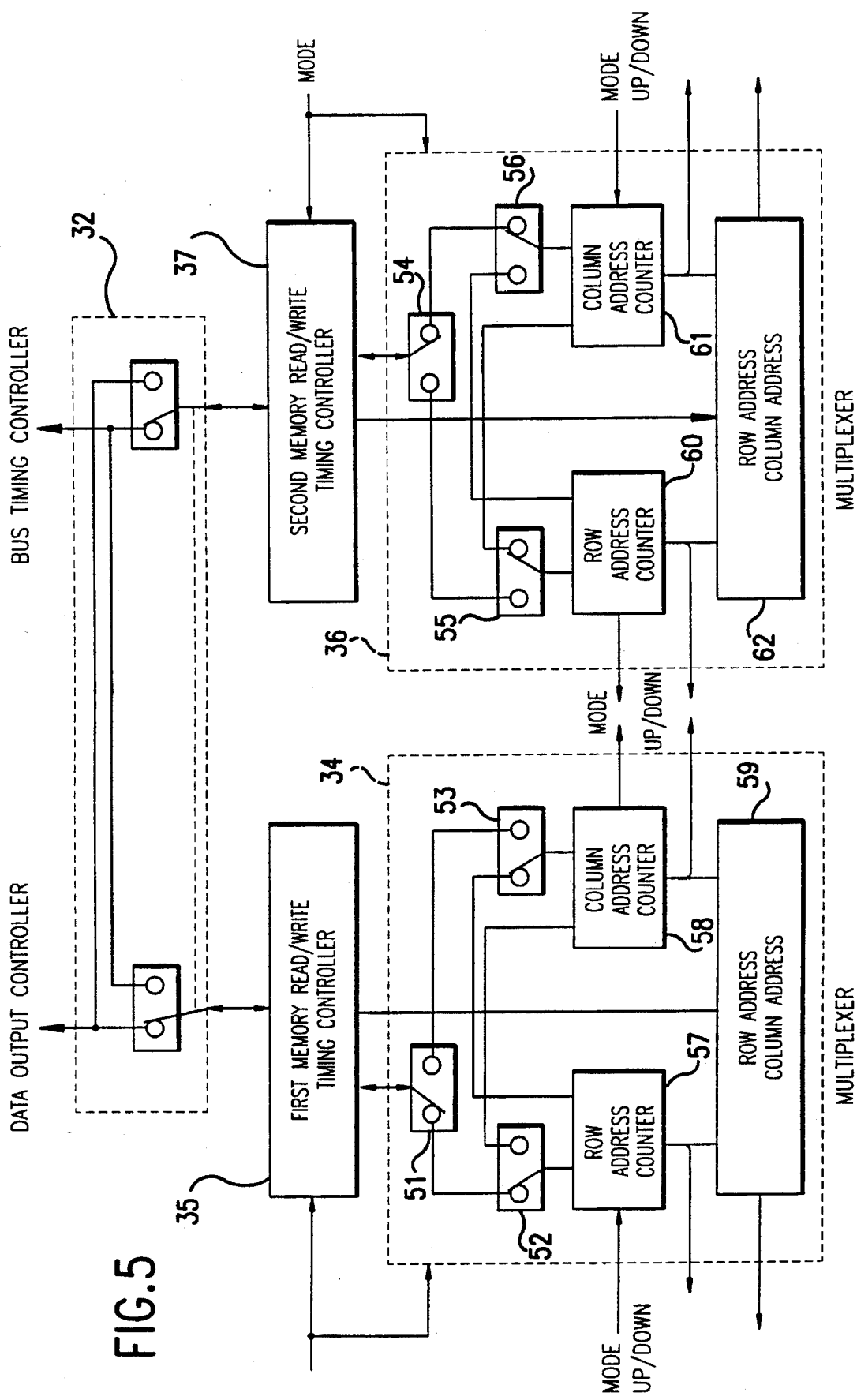
FIG. 5 is a view schematically illustrating the structure of one specific example of peripheral devices adjacent to an address controller.

FIG. 5 is a view schematically illustrating the structure of one specific example of peripheral devices adjacent to each address controller. There are shown in FIG. 5, selectors 51 through 56, row address counters 57 and 60, column address counters 58 and 61, and multiplexers 59 and 62. The first address controller 34 comprises the selectors 51, 52 and 53, the row address counter 57, the column address counter 58 and the multiplexer 59. The second address controller 36 comprises the selectors 54, 55 and 56, the row address counter 60, the column address counter 61 and the multiplexer 62. Since the first address controller 34 is identical in structure to the second address controller 36, the first address controller 34 will be described below. In accordance with mode data supplied from the read/write mode setting register 39, the selectors 51 through 53 select one of the address counters, which is supplied with a clock output from the first memory read/write timing controller 35. Under the switching action of the selectors 51 through 53, a carry signal output from the selected address counter is input to the other address counter as a clock used for the other address counter. The selectors 51 through 53 make a selective decision as to whether the reading and writing of data is made in the row or column direction.

Figure 6:
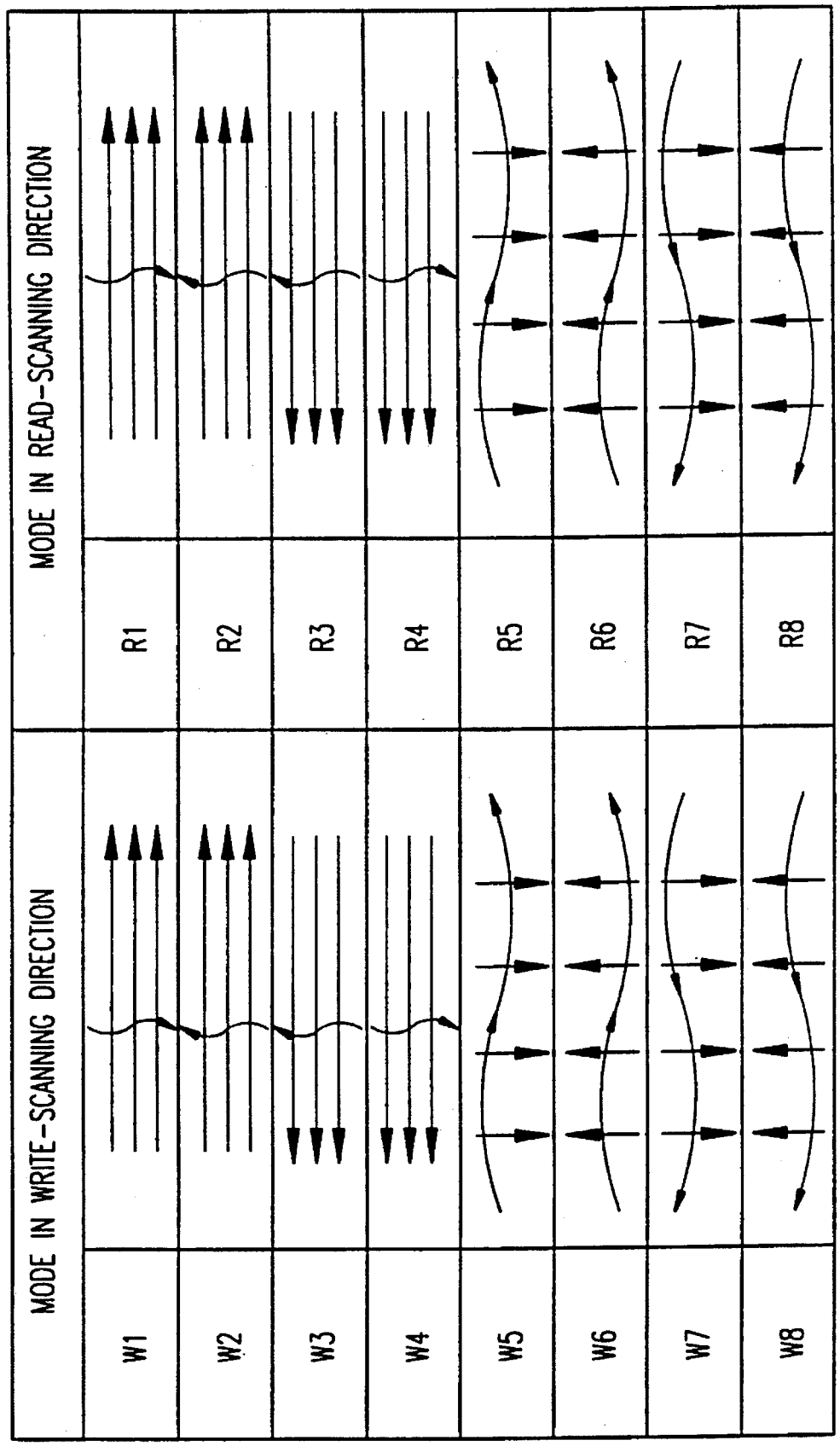
FIG. 6 is a view for describing operating modes.
Figure 11:
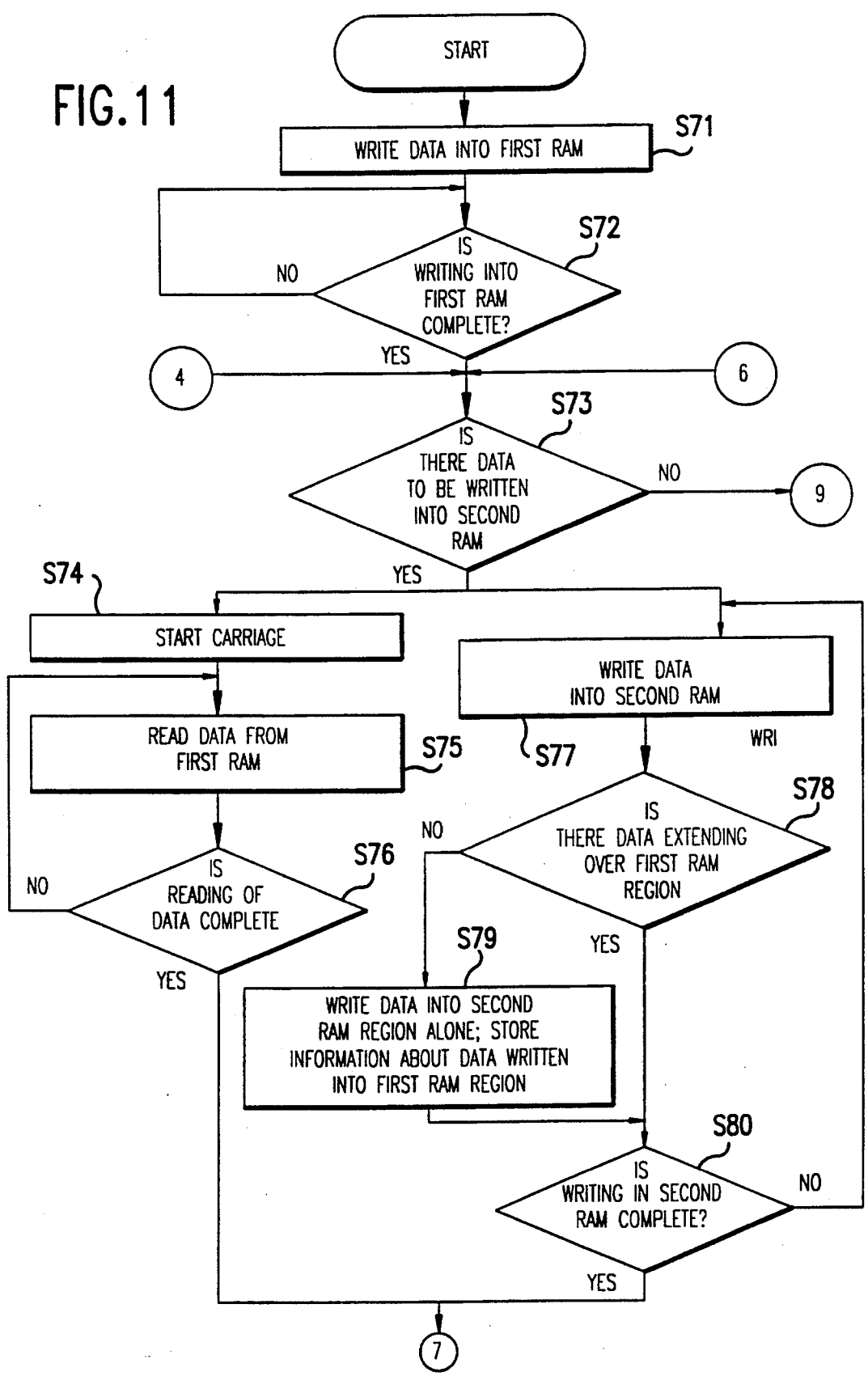
Figure 12:
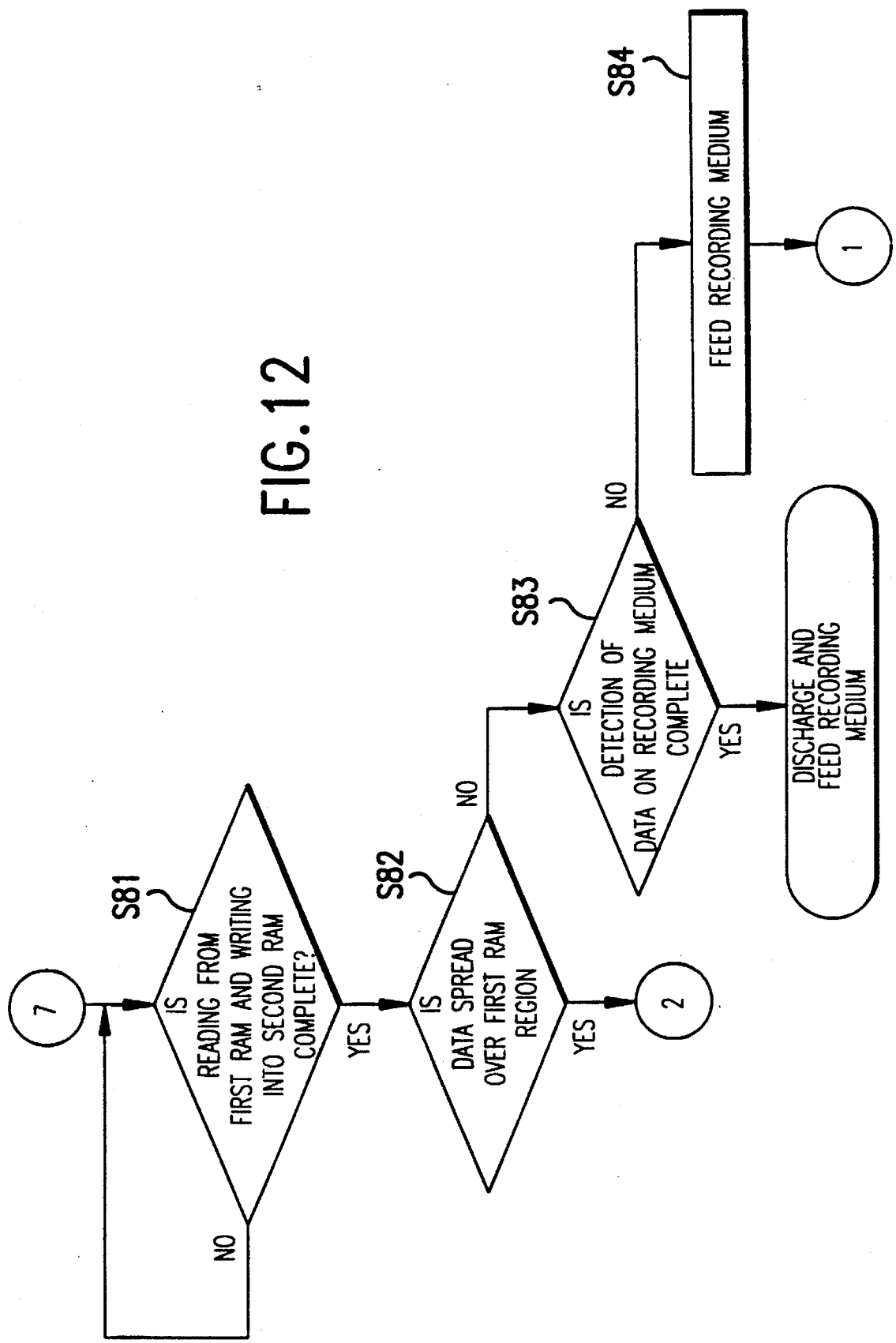
Figure 13:
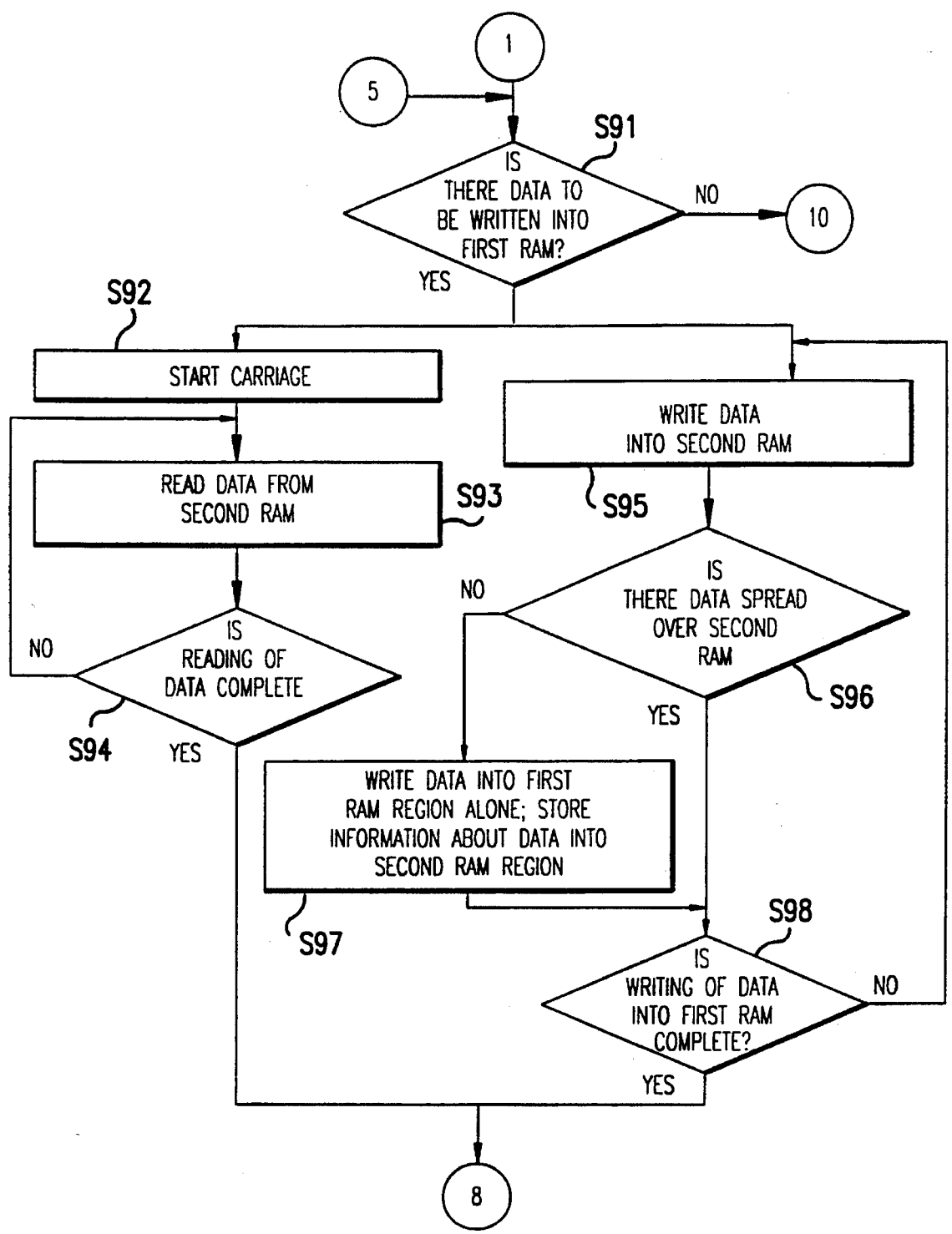
Figure 15A:
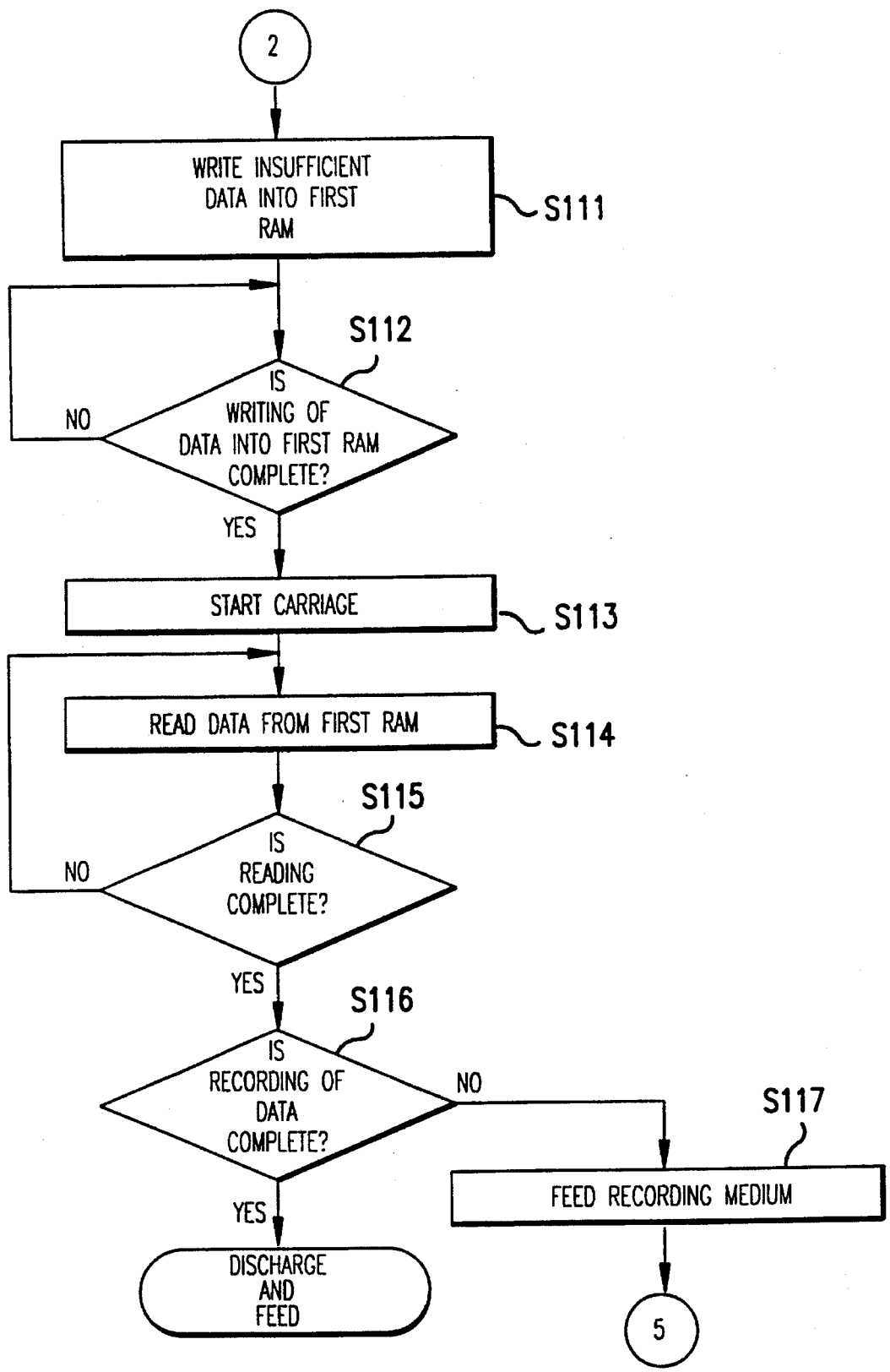
Figure 15B:
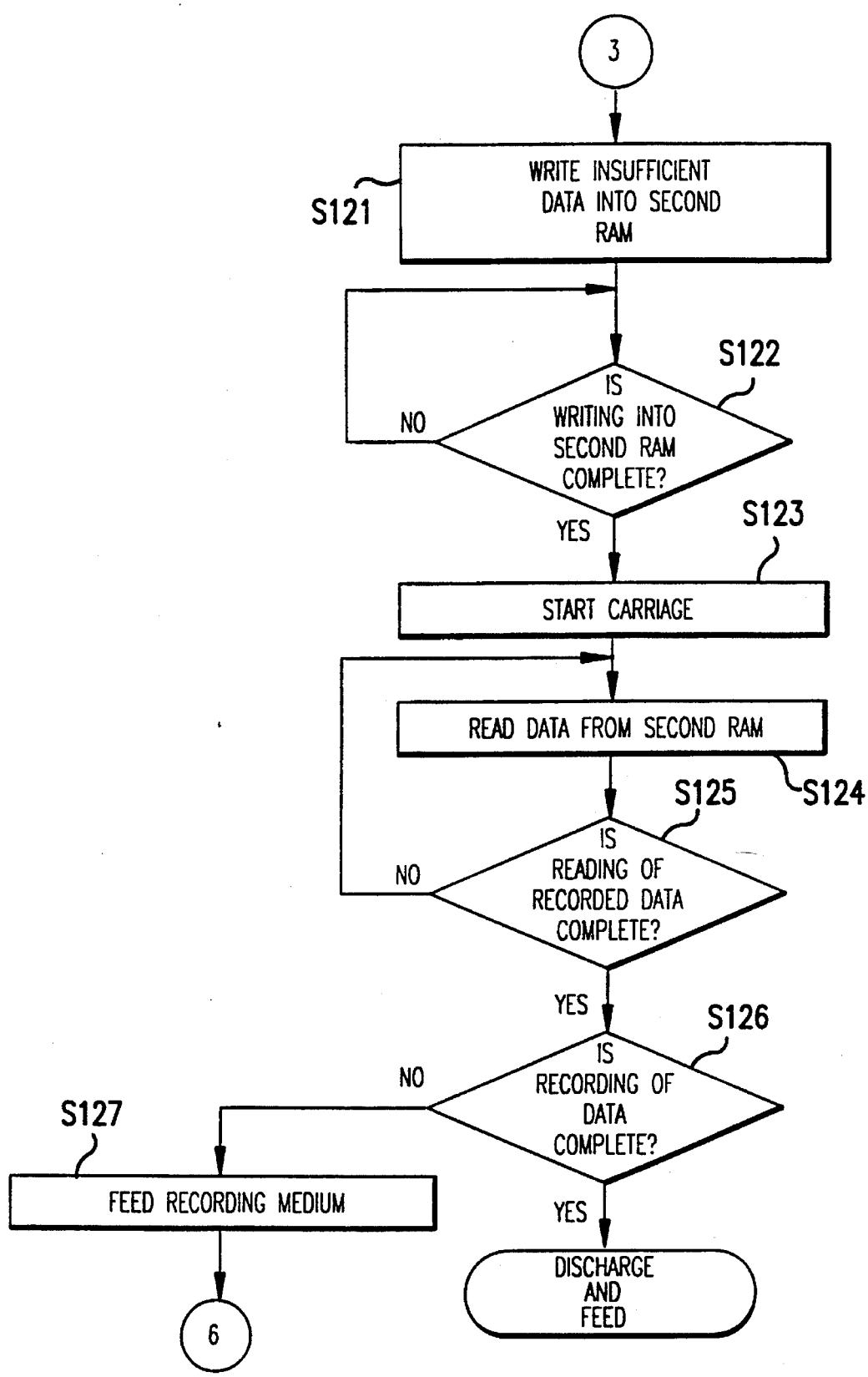
Figure 16B:
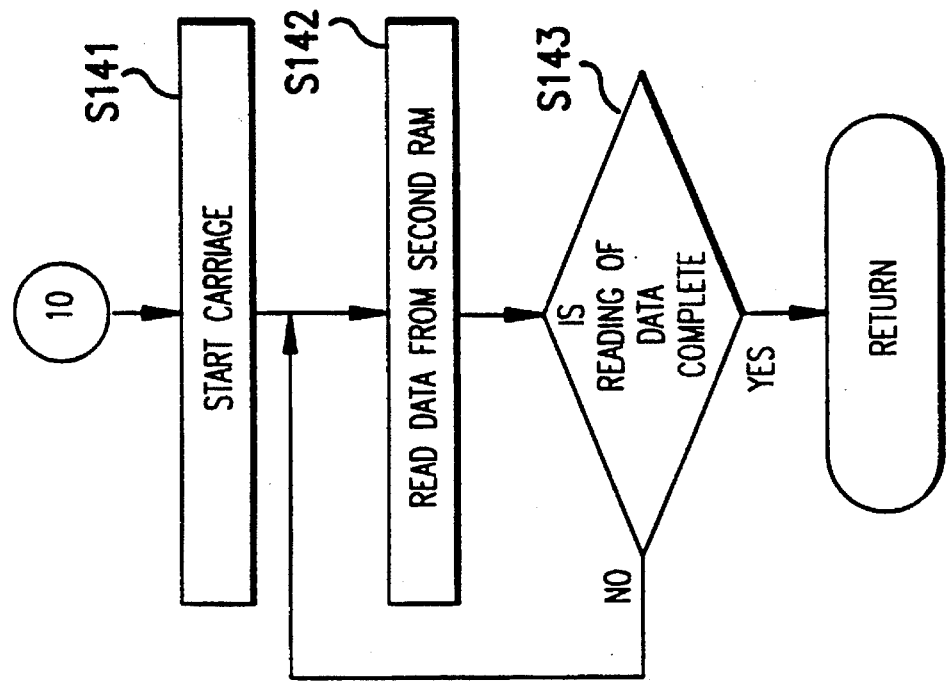
Figure 16A:
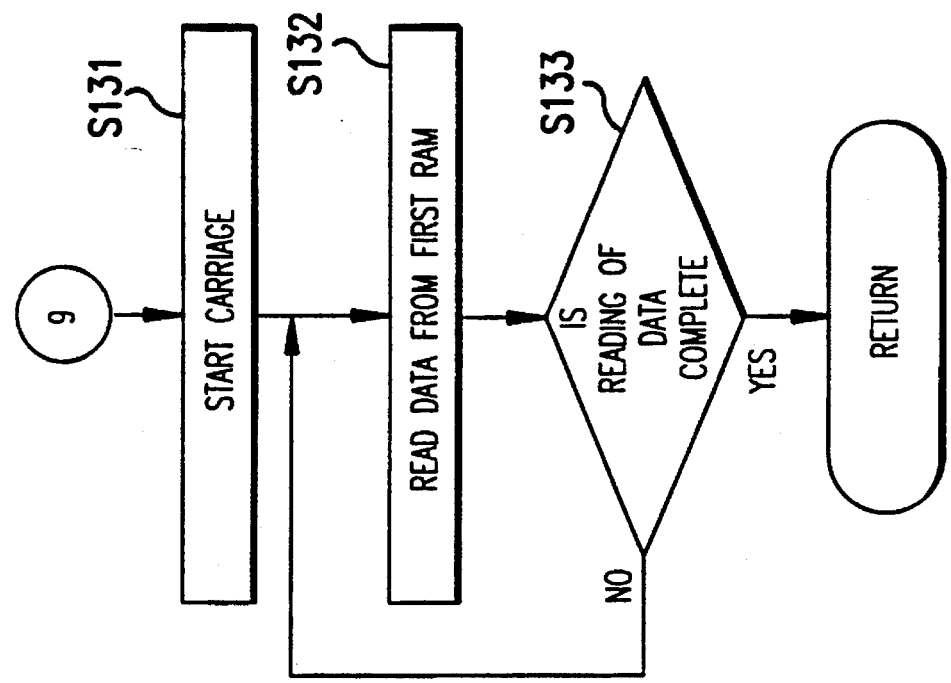

Either one of a countup and a countdown is set to each of the row address counter 57 and the column address counter 58 based on the mode data supplied from the read/write mode setting register 39. When the data is read or written in the row direction, for example, either one of the reading and writing of the data from left to right and from right to left can be selected by such a setting. Similarly, when the data is read and written in the column direction, either one of the reading and writing of the data from top to bottom and from bottom to top can be selected. By setting the selector 51 through 53 and the row address counter 57 and the column address counter 58 in this way, eight operating modes shown in FIG. 6 can be established. Different operating modes can be set upon writing and reading. The switching of the operating modes in reading and writing is made by the selector 38 shown in FIG. 3. This switching action permits the recording of image data in various formats and makes it possible to easily perform image processes such as rotation of an image, image conversion, etc. Values output from the row address counter 57 and the column address counter 58 are output to the read/write mode setting register 39.

In accordance with the timing signal generated from the first memory read/write timing controller 35, the multiplexer 59 sends the values of the row address counter 57 and the column address counter 58 to the first RAM 40 as addresses on the time-sharing basis. If the image RAM 11 is not a memory of such a type that the addresses are received on the time-sharing basis, then the multiplexer 59 is unnecessary. The values of the row address counter 57 and the column address counter 58 may be sent to the first RAM 40 as they are.

One example of the recording operation of the recording apparatus according to the present invention will be described below. A description will first be made of normal recording in which the printing of an image does not extend over two band or strip regions. FIG. 7 is a view for explaining one example of a print made by the normal recording. FIGS. 8(A)–8(C) are views for explaining the contents in the image RAM at the time of the normal recording. Here, the normal recording illustrated in FIG. 7 will be described by way of illustrative example. The recording apparatus successively records character data on the respective strip regions in order of ①, ② and ③ in FIG. 7.

The recording of the data on the region ① will first be made. When a character string "ABCDEF . . . abcdef" to be recorded is sent from the host computer 2, the CPU 3 receives it. In order to write data into the first RAM 40, the CPU 3 then sets the selector 32 so as to connect the bus timing controller 31 and the first memory read/write timing controller 35 to each other. At this time, the CPU 3 may be activated so as to clear the first RAM 40. The operation of clearing of the first RAM 40 can be effected immediately before the writing or after completion of the reading. A mode corresponding to the initial character "A" in the character string to be recorded is set to the read/write mode setting register 39. The mode to be set thereto is set according to a characteristic of a bit map image to be written. The mode is set according to the direction of transfer of the bit map image stored in the font ROM 5 and the presence or absence of the image rotation, the image conversion, etc., for example. The setting of the mode may be performed for each character or may be reset when a specific control code is received. The reading mode may initially be set together with the writing mode. Processes such as selection of counts in the row and column directions by the selectors 51 through 53 shown in FIG. 5, selection of a countup and a countdown of the row address counter 57 and the column address counter 58 by the selectors 51 through 53, etc. are performed according to such mode setting. Further, a write starting address is set and values compared by the comparator in the read/write mode setting register 39, i.e., addresses for a write region and the like are also set. Then, a corresponding bit map image is fetched or read from the font ROM 5 based on the code corresponding to the initial character "A" in the character string to be recorded and thereafter transferred to the bus timing controller 31 via the common bus 18.

The bus timing controller 31 converts image data sent as parallel data into image data represented in the form of one bit. Further, the bus timing controller 31 requires the first memory read/write timing controller 35 to generate the data write signal and is activated in synchronism with the data write signal so as to transfer one-bit write data to the first RAM 40. At this time, the first memory read/write timing controller 35 sends the timing signal to the first address controller 34. In the first address controller 34, the row-directional address counter and the column-directional address counter start counting in accordance with the set mode on the basis of the timing signal. Then, the multiplexer outputs addresses to the first RAM 40. In the first RAM 40, the write data output from the bus timing controller 31 are stored at the addresses output from the first address controller 34.

Such an operation is repeated by the number of bits of one transfer via the common bus 18, such as 8 bits, 16 bits and 32 bits. When the data writing corresponding to only the number of bits of one transfer is completed, the next writing of transfer data is effected. Thus, all the data corresponding to the character "A" are written into the first RAM 40. When the writing of the data corresponding to the character "A" is completed, the remaining character string "BCDEF . . . abcdef" to be recorded is written into the first RAM 40 in the same manner as described above. Further, a character string "ABCDEF . . . abcdef" to be recorded, which corresponds to the second line, is also loaded into the first RAM 40. The manner of completion of writing of the character string into the first RAM 40 is shown in FIG. 8(A).

When all the data to be recorded on the region ① are written into the first RAM 40, the CPU 3 performs the switching action of the selector 32 in such a manner that the second RAM 41 is set as a RAM for writing data therein and the first RAM 40 is set as a RAM for reading the data therefrom. Then, data to be recorded on the region ② are written into the second RAM 41. At this time, the second RAM 41 is identical in writing operation to the first RAM 40 and its description will therefore be omitted.

The reading of the data from the first RAM 40 is carried out simultaneously with the writing referred to above. Before the reading of the data from the first RAM 40, the reading mode is set to the read/write mode setting register 39. Where the reading mode has been already set upon setting the writing mode, the setting of the reading mode is unnecessary. In response to the image data request issued from the head controller 12, the data output controller 33 requires either one of the first and second memory read/write timing controllers 35 and 37 to generate the data read signal. The first memory read/write timing controller 35 transmits the timing signal to the first address controller 34. The first address controller 34 is activated in response to the timing signal so as to cause the row-directional and column-directional address counters to count based on the set mode and to supply addresses from the multiplexer to the first RAM 40. The first RAM 40 reads data from the addresses output from the first address controller 34 and outputs it to the data output controller 33. In the data output controller 33, the read data from the image RAM 11 is temporarily stored in the internal register thereof in synchronism with the data read signal output from the first memory read/write timing controller 35. The data stored in the internal register of the data output controller 33 is transferred to the data outputting register in synchronism with the image data request issued from and the read clock output from the head controller 12, and then sent to the head controller 12. Thereafter, the head is driven based on the read data so as to perform the data recording. Further, the carriage performs a scanning process to record the data on the strip regions.

The reading of the data from the first RAM 40 and the writing of the data into the second RAM 41 are carried out simultaneously. When either one of the reading and writing processes is first completed, the completion of the process later than the first process is placed on a waiting state. The manner of completion of writing of the data into the second RAM 41 is illustrated in FIG. 8(B). As shown in FIG. 8(B), the data is read from the first RAM 40. When the writing and reading processes are completed, the line-feeding operation, the operation of feeding of the recording medium, etc. are normally performed and the recording of the data on the next strip region is placed on a waiting state. Then, the selector 32 is switched over to perform the writing of the data recorded on the region ③ into the first RAM 40 again. Further, the reading and recording of the data recorded on the region ②, which have been written into the second RAM 41, are carried out simultaneously. The manner in which the data recorded on the region ③ have been written into the first RAM 40 is illustrated in FIG. 8(C).

Thus, the writing and reading of the data into and from the first and second RAMs 40 and 41 are alternately effected. Such a writing and reading process enables the writing of a bit map image into another RAM even during the period in which the reading and recording of data into the head controller 12 from the image RAM 11 are being carried out. Thus, the recording apparatus can be activated at a high speed.

A description will now be made of the case where an image extending over two strip regions is recorded. FIG. 9 is a view for describing one example of a print of the image extending over the two strip regions. FIGS. 10(A)–10(B) are views for describing the contents of the image RAM at the time of recording of images each extending over two strip regions and the images recorded in the image RAM. Here, a description will be made of, as one example, a case where a character "F" extends over two regions and is recorded thereon as shown in FIG. 9. The recording apparatus successively records data on the respective strip regions in order of ①, ② and ③ in FIG. 9. Position coordinates are specified to respective characters with the lower part on the left side of each character regarded as the standard. Although the character "F" extends over the two regions ① and ②, the lower part on the left side of the character "F" spreads over the region ②. Therefore, when character data in the region ② are developed in the form of a bit map, the character "F" is developed in the form of the bit map. Here, the character "F" is illustrated in an enlarged font. However, even if the character "F" is represented in normal font size, the same operation is made where the character "F" extends over the two regions.

A character string in the region ① is first written into the first RAM 40. The operation of writing of the data therein is effected in a manner similar to the aforementioned normal recording operation. That is, the selector 32 is switched over so that a RAM for writing the character string therein is set as the first RAM 40. Then, text data about character strings "ABCDEF . . . abcdef", which correspond to two lines, are successively read from the font ROM 5 and bit map images are written into the first image RAM 40. Since, in this case, the position coordinates with the lower part on the left side of the character "F" regarded as the standard fall within the region ②, the existence of the character "F" is not recognized. The manner in which the data recorded on the region ① have been written into the first RAM 40, is shown in FIG. 10(A).

Next, the selector 32 is changed over to read the data from the first RAM 40 so as to effect a print operation and at the same time to write bit map images of a character string "ABCDEF . . . abcdef" recorded on the region ②, a character "F" and a character string "ABCDEF . . . abcdef" into the second RAM 41. The contents in the image RAM 11 and the image recorded therein at this time are illustrated in FIG. 10(B). When it is recognized that the character "F" exists in the region ① during the process shown in FIG. 10, a bit map image corresponding to an upper portion of the character "F" is controlled so as to be written into the first RAM 40 after the reading of the data recorded on the region ① from the first RAM 40 and the printing of the read data have been completed. Thus, the bit map images are written into the first and the second RAMs 40 and 41. After completion of the above writing, the data is read from the first RAM 40 and the printing and recording of the data are performed again. At this time, it is detected that the character "F" extends over the region ① when the bit map image recorded on the region ② is developed. Therefore, the feeding of the recording medium in its conveying direction is stopped after the recording of the data on the region ① has been made. Then, the bit map image corresponding to the upper portion of the character "F" written into the first RAM 40 is recorded during the 2nd recording operation. The state of the image RAM 11 and the manner of the image recorded on the image RAM 11 at this time are shown in FIG. 10(C).

Since the character, which extends over the aforementioned two regions, is not necessarily limited to one as described in the present embodiment, the recording of the character on the same region can be made again when the character string which belongs to the region subjected to the bit map development, has been written. It is needless to say that each time the character extending over the two regions is produced, the recording of the character on the same region may be carried out again. In this case, however, the efficiency of its recording is reduced. When a character extending over two regions is detected, characters other than the character extending over the two regions are subjected to the bit map development and written into the image RAM 11. Finally, the character extending over the two regions may be subjected to the bit map development and written into the image RAM 11. In doing so, the RAM, which is performing reading and recording processes, writes bit map images of other characters therein until it can treat with a writing process. It is therefore possible to shorten a waiting time interval corresponding to a period in which the recording process is being carried out and a time interval from the initial recording to the re-recording of image data on the same region. Thus, the recording of the image data on the image RAM can be carried out more efficiently.

Thereafter, the data is read from the second RAM 41 and recorded on the region ②. Further, bit map images corresponding to character data on the region ③ are written into the first RAM 40. The state of the image RAM 11 at the time of completion of the recording of the data on the region ② and the images recorded in the image RAM 11 are shown in FIG. 10(D).

Thus, even if there is a character developed in a state of being spread over a region prior to a region while being in writing at present, image data can be recorded by writing a developed image into another RAM and recording it on the same region again without feeding the recording medium. Since, at this time, the recording medium is not conveyed in the reverse direction, recording positions are not displaced or shifted and the image is not deteriorated in quality.

The aforementioned recording operations will now be described with reference to flowcharts shown in FIGS. 11 through 16. When the recording operation is started, image data to be recorded is written into the first RAM 40 in S71. When the completion of writing of the data into the first RAM 40 is detected in S72, it is decided in S73 whether or not there is data to be recorded on the next strip region. If the answer is No, it is then decided that the writing of all the data to be recorded into the RAM has been completed. Thus, the routine proceeds to S131 through S133 shown in FIG. 16(A), where the data written into the first RAM 40 is read and recorded and the recording operation is completed.

If the answer is Yes in S73, then the routine proceeds to S74 and S77, where writing and reading processes are performed. That is, the data written into the first RAM 40 is read therefrom and recorded in S74 through S76. In S77 through S80, the writing of data on the next strip region into the second RAM 41 is then carried out simultaneously with the processes executed in S74 through S76. When a process for writing the data into the second RAM 41 is executed, it is decided in S78 whether or not there is data extending over the region in the first RAM 40 where the data is being recorded at present. If the answer is No in S78, then the routine proceeds to S79, where only a portion of data extending over two regions, which falls within the region of the second RAM 41, is written into its corresponding region. Further, the data to be written into the first RAM 40 is stored. The data which does not extend over the two regions, is written into the second RAM 41 as it is. Such processing is repeated until the data to be written into the second RAM 41 is brought into naught.

When it is decided in S76 that the reading of the data from the first RAM 40 has been completed or it is decided in S80 that the writing of the data into the second RAM 41 has been completed, the routine proceeds to S81, where the next step is placed on a waiting state until both the reading and writing processes are completed. If it is decided in S81 that both processes have been completed, then the routine proceeds to S82, where it is determined whether or not there is data extending over the region in the first RAM 40 during a process for writing the data into the second RAM 41. If the answer is Yes in S82, then the routine proceeds to S111 shown in FIG. 15(A), where the data extending over the region is processed. If the answer is No in S82, then the routine proceeds to S83, where it is decided whether or not the completion of recording of the data on the recording medium is detected. If the answer is Yes in S83, then the recording medium in which the data recording process has been completed, is discharged and a new recording medium is fed. Thereafter, the recording operation is executed again from the beginning. If the answer is No in S83, then the recording medium is fed by a width to be recorded. Thereafter, the routine proceeds to S91 shown in FIG. 13 to perform the recording of data on the next strip region.

If the answer is Yes in S82, then the routine proceeds to S111, where data corresponding to a portion, which falls beyond or overflows the region in the second RAM 41, is written into the first RAM 40. If it is decided in S112 that the writing of the data into the first RAM 40 has been completed, then the data written into the first RAM 40 is read out and recorded in S113 through S115. Since, at this time, the feeding of the recording medium remains stopped, the data is recorded again on the region used in the data recording in S74 through S76. As a result, the data corresponding to the portion extending to the previous region is recorded and hence an image recorded on that region is completed. When the data corresponding to the portion extending to the previous region, which has been written into the first RAM 40, is recorded on the recording medium, the routine proceeds to S116, where it is decided whether or not the completion of recording of the data on the recording medium is detected. If the answer is Yes in S116, then the recording medium is replaced by another and a recording operation is started again. If the answer is No in S116, then the routine proceeds to S117, where the recording medium is fed. Thereafter, the routine proceeds to S91 shown in FIG. 13, where the recording of contents in the second RAM 41 on the recording medium is started.

Processes to be executed in S91 through S98, which are opposite to the processes executed in S73 through S80, correspond to those for reading the data from the second RAM 41 and writing the data into the first RAM 40. If it is decided in S91 that there is further data to be recorded, then the routine proceeds to S92 and S95, where writing and reading processes are executed. That is, the data written into the second RAM 41 is read and recorded in S92 through S94. In S95 through S98, the writing of data on the next strip region into the first RAM 40 is carried out simultaneously with the processes executed in S92 through S94. When the writing of the data into the first RAM 40 is executed, it is decided in S96 whether or not there is data extending over the region in the second RAM 41 where the data is being recorded at present. If the answer is No in S96, then the routine proceeds to S97, where only a portion of data extending over two regions, which falls within the region of the first RAM 40, is written into its corresponding region. Further, the data to be written into the second RAM 41 is stored. The data which does not extend over the two regions, is written into the first RAM 40 as it is. Such processing is repeated until the data to be written into the first RAM 40 is brought into naught.

When it is decided in S94 that the reading of the data from the second RAM 41 has been completed or it is decided in S98 that the writing of the data into the first RAM 40 has been completed, the routine proceeds to S101, where the next step is placed on a waiting state until both the reading and writing processes are completed. If it is decided in S101 that both processes have been completed, then the routine proceeds to S102, where it is determined whether or not there is data extending over the region in the second RAM 41 during a period in which a process for writing the data into the first RAM 40 is being executed. If the answer is Yes in S102, then the routine proceeds to S121 shown in FIG. 15(B), where the data extending over the region is processed. If the answer is No in S102, then the routine proceeds to S103, where it is decided whether or not the completion of recording of the data on the recording medium is detected. If the answer is Yes in S103, then the recording medium in which the data recording process has been completed, is discharged and a new recording medium is fed. Thereafter, the recording operation is executed again from the beginning. If the answer is No in S103, then the recording medium is fed by a width to be recorded. Thereafter, the routine proceeds to S73 shown in FIG. 11 to record data on the next strip region. Further, a process for reading the data from the first RAM 40 and a process for writing the data from the second RAM 40 are executed.

If the answer is Yes in S102, then the routine proceeds to S121, where data corresponding to a portion, which falls beyond or overflows the region in the first RAM 40, is written into the second RAM 41. If it is decided in S122 that the writing of the data into the second RAM 41 has been completed, then the data written into the second RAM 41 is read out and recorded in S123 through S125. Since, at this time, the feeding of the recording medium remains stopped, the data is recorded again on the region used for the data recording in S92 through S94. As a result, the data corresponding to the portion extending to the previous region is recorded and hence an image to be recorded on that region is completed. When the data corresponding to the portion extending to the previous region, which has been written into the second RAM 41, is recorded on the recording medium, the routine proceeds to S126, where it is decided whether or not the completion of recording of the data on the recording medium is detected. If the answer is Yes in S126, then the recording medium is replaced by another and a recording operation is started again. If the answer is No in S126, then the routine proceeds to S127, where the recording medium is fed. Thereafter, the routine proceeds to S73 shown in FIG. 11, where the recording of contents in the first RAM 40 on the recording medium is started and the writing of the data into the second RAM 41 is executed as needed.

According to the operations referred to above, the data extending over the region prior to the region while being in writing at present can be recorded without feeding the recording medium in the reverse direction. Thus, an image to be recorded can be obtained at a high speed and in high quality.

According to the aforementioned embodiment, the RAM having the two strip regions is used and even a font having a size twice the size of the strip regions can be recorded without feeding the recording medium in the reverse direction. The number of RAMs to be used is not necessarily limited to two. An increase in the number of the RAMs can treat a further large font. When the number of the RAMs is three, for example, even a font having a size three times the size of a strip region can be recorded without feeding the recording medium in the reverse direction. If, in this case, a font having a size twice the size of the strip region is brought to the maximum, then data can be written into the remaining two RAMs while the data is being read from one RAM and recorded on the recording medium. It is therefore possible to shorten a time interval required to stop a data recording operation and to record an image on the recording medium at a higher speed. However, when the number of the RAMs increases, an increase in cost occurs and a control operation is also complex. Therefore, the number of the RAMs may be decided in view of these items and an allowable multiple.

Further, the aforementioned embodiment describes the case where the character data are recorded on the recording medium. However, the data to be recorded may be raster image data read by a scanner, for example. In this case, the raster image data may be transferred to an image RAM for each strip region. Of course, processes such as rotation of an image, image conversion, etc. can be carried out by suitably setting modes for writing data into and reading it from the image RAM.

Moreover, the above embodiment describes the inkjet recording apparatus as an example. If, however, a serial type recording apparatus is used, then the present invention can be applied to a recording apparatus of any other recording type. Further, the present invention can be applied even to a color recording apparatus such as a recording apparatus having respective color heads for cyan, magenta, yellow and black, which are mounted on a carriage and two or more RAM provided for each color as described above.

Having now fully described the invention, it will be apparent to those skilled in the art that many changes and modifications can be made without departing from the spirit or scope of the invention as set forth herein.

What is claimed is:

1. A controller for a recording apparatus, the recording apparatus able to read data contained in regions, where each two adjacent regions define a printing zone divided by a boundary, comprising:

at least two storing means for storing image data for a printing zone, one of the at least two storing means storing image data from one of the two adjacent regions of the printing zone, an other of the at least two storing means storing image data from the other of the two adjacent regions, and the at least two storing means also outputting the data to enable a printing operation;

means for determining if a portion of image data of one of the two adjacent regions stored within the at least two storing means extends across the boundary from the one of the two adjacent regions of the printing zone and into the other of the two adjacent regions; and controlling means for storing the portion of the image data that extends across the boundary into the other of the two adjacent regions into the other of the at least two storing means storing the image data for the other of the two adjacent regions, wherein the controlling means inhibits the movement of the recording medium when the means for determining determines that a portion of the image data of the one of the at least two storing means extends across the boundary of the printing zone until the image data that extends across the boundary of the printing zone can be sent to be printed, said controlling means also controlling developing a portion of the image data on the other of the at least two storing means and controlling printing the portion of the image data in the other of the at least two storing means on the recording medium.

2. A controller for a recording apparatus according to claim 1, further comprising interfacing means for transmitting and receiving data from at least one of computer means and scanner means and scanning means for scanning the recording medium along a recording-medium conveying direction; and wherein said at least two storing means comprise image RAMs.

3. A controller for a recording apparatus according to claim 2, wherein said scanning means is a carriage having a recording head mounted thereon, said recording head having nozzles defined therein.

4. A controller for a recording apparatus according to claim 3, further comprising memory controlling means for controlling said one of the at least two storing means and head controlling means for controlling a timing for delivering ink from the nozzles of said recording head.

5. A controller for a recording apparatus according to claim 4, wherein said memory controlling means comprises bus timing controlling means having a parallel/serial converting function for converting image data sent as parallel data into image data in the form of one bit; data output controlling means for outputting printing data in synchronism with a read clock generated from said head controlling means and effecting interface control on said head controlling means; selecting means for switching said image RAMs subjected to writing control executed by said bus timing controlling means and reading control executed by said data output controlling means; and first and second memory read/write timing controlling means for producing control signal required to write data into and read data from said one of the at least two storing means.

6. A controller for a recording apparatus according to claim 4, wherein said memory controlling means further comprises first and second address controlling means for setting a specific one-bit address to said one of the at least two storing means; and read/write mode setting means for storing setting data and for determining operating modes used for said bus timing controlling means, said first and second memory read/write timing controlling means, said data output controlling means and said first and second address controlling means.

7. A controller for a recording apparatus according to claim 6, wherein said first and second address controlling means comprise row-directional address counters, column-directional address counters and multiplexers respectively.

8. A controller for a recording apparatus according to claim 1, further comprising processing means for controlling devices provided within said recording apparatus and connecting means for providing electrical connections between said devices.

9. A controller for a recording apparatus according to claim 8, wherein said processing means and said connecting means are a CPU and a bus, respectively.

10. A controller according to claim 1, wherein the recording apparatus includes a head movably mounted on a carriage.

11. A controller according to claim 10, where the head is movable to read image data of a single region of the printing zone at one time and the image data for each single region of the printing zone is stored in a corresponding one of the at least two storing means.

12. A controller according to claim 10, where the head is movable to print out the data stored in each of the at least two means for storing on a movable recording medium.

13. A controller for a recording apparatus according to claim 10, further comprising motor controlling means for controlling a motor used to move said carriage relative to said recording medium and I/O means for controlling sensors and inputting data sensed by the sensors.

14. A recording method for a recording apparatus, the recording apparatus having a first memory storing image data from one of two adjacent regions and a second memory storing image data from another of the two adjacent regions, said two adjacent regions define a printing zone with a boundary therebetween, the method comprising the steps of:

writing a character string of image data that does not extend over a region into a first memory, when the character string of image data does not have a portion that extends over the boundary from the one of the two adjacent regions of the printing zone and into the other of the two adjacent regions;

reading image data from the first memory and recording the character string of image data read from the first memory on a recording medium;

writing a portion of an other character string of image data that extends over the boundary of the one of the two adjacent regions into the second memory, when the other character string of image data extends over the boundary from the one of the two adjacent regions and into the other of the two adjacent regions;

writing the portion of the other character string of image data that does not extend over the boundary of the one of the two adjacent regions into the first memory;

recording the portion of the character string of image data stored in the first memory, while inhibiting relative movement of the recording medium; and recording the portion of the character string of image data stored in the second memory, while permitting relative movement of the recording medium.

15. A method according to claim 14, further comprising the step of transmitting and receiving data from at least one of computing means and scanning means for the writing, reading and recording steps.

16. A method according to claim 14, further comprising the step of scanning the recording medium along a recording medium conveying direction.

17. A method according to claim 16, wherein the scanning step includes the steps of moving a carriage having a recording head mounted thereon along the recording medium, wherein the recording head has nozzles defined therein.

18. A method according to claim 17, wherein the recording step further comprises controlling delivery of an ink from the nozzles of the recording head for recording data on the recording medium.

19. A method according to claim 17, wherein the moving step further comprises the step of controlling a motor to move the carriage relative to the recording medium.

20. A method according to claim 17, wherein the moving step includes moving the head to read image data of a single region of the printing zone at one time, wherein the image data for each single region of the printing zone is stored in a corresponding one of the at least two storing means.

21. A method according to claim 17, wherein the moving step includes moving the head to print data stored in each of the at least two means for storing on the movable recording medium.

22. A method according to claim 17, further comprising the step of controlling the input of data sensed by sensors on the recording head.

23. A method according to claim 14, further comprising the steps of recording apparatus converting image data from parallel data into image data in the form of one bit; outputting printing data in synchronism with a read clock generated from said head controlling means; and producing a control signal to write data into and read data from the one of the at least two storing means.

* * * * *